United States Patent
Park et al.

(10) Patent No.: US 10,366,828 B2
(45) Date of Patent: Jul. 30, 2019

(54) APPARATUS FOR WIRELESS POWER TRANSFER, APPARATUS FOR WIRELESS POWER RECEPTION AND COIL STRUCTURE

(71) Applicant: KOREA ELECTROTECHNOLOGY RESEARCH INSTITUTE, Changwon (KR)

(72) Inventors: Young Jin Park, Seoul (KR); Jin Wook Kim, Ansan (KR); Kwan Ho Kim, Seoul (KR); Do Hyun Kim, Ansan (KR); Jong Ryul Yang, Gwacheon (KR)

(73) Assignee: KOREA ELECTROTECHNOLOGY RESEARCH INSTITUTE, Changwon (KR)

( * ) Notice: Subject to any disclaimer, the term of this patent is extended or adjusted under 35 U.S.C. 154(b) by 292 days.

(21) Appl. No.: 14/981,796

(22) Filed: Dec. 28, 2015

(65) Prior Publication Data
US 2016/0111208 A1    Apr. 21, 2016

Related U.S. Application Data

(63) Continuation-in-part of application No. PCT/KR2014/011398, filed on Nov. 26, 2014.

(30) Foreign Application Priority Data

Apr. 30, 2014  (KR) .................. 10-2014-0052704
Sep. 5, 2014   (KR) .................. 10-2014-0118921

(51) Int. Cl.
*H01F 27/42*  (2006.01)
*H01F 38/14*  (2006.01)
(Continued)

(52) U.S. Cl.
CPC ............ *H01F 38/14* (2013.01); *H01F 27/006* (2013.01); *H01F 27/2823* (2013.01); *H02J 50/10* (2016.02)

(58) Field of Classification Search
CPC ......... H01F 38/14; H02J 5/005; H04B 5/0037
See application file for complete search history.

(56) References Cited

U.S. PATENT DOCUMENTS

| | | | |
|---|---|---|---|
| 2013/0074543 A1* | 3/2013 | Vahid ..................... | A44C 15/00 63/1.11 |
| 2013/0127253 A1* | 5/2013 | Stark .................... | A61N 1/3787 307/104 |

(Continued)

FOREIGN PATENT DOCUMENTS

| | | |
|---|---|---|
| CN | 103683438 A | 3/2014 |
| KR | 10-2013-0099699 A | 9/2013 |

(Continued)

OTHER PUBLICATIONS

International Search Report for PCT/KR2014/011398 filed on Nov. 26, 2014.

*Primary Examiner* — Sibin Chen

(57) ABSTRACT

The present invention relates to a transmitting device for wireless power transmission, which includes: a bowl-shaped transmitting device body; and a transmitting coil unit for wirelessly transmitting power to a receiving device based on power supplied from a power source. The transmitting coil unit may include a multi-loop coil unit wound in the bottom surface of the transmitting device body, and a helical coil unit wound around the side wall of the transmitting device body, the helical coil unit being wound to increase the radius of a coil loop in a direction to the upper part of the transmitting device body, and being extended from the end of the multi-loop coil unit.

20 Claims, 47 Drawing Sheets

(51) Int. Cl.
    *H01F 27/28*     (2006.01)
    *H01F 27/00*     (2006.01)
    *H02J 50/10*     (2016.01)

(56) References Cited

U.S. PATENT DOCUMENTS

| | | |
|---|---|---|
| 2013/0154383 A1 | 6/2013 | Kasturi et al. |
| 2013/0221913 A1 | 8/2013 | Kim |
| 2013/0285620 A1* | 10/2013 | Yamamoto ............ H02J 7/0029 |
| | | 320/155 |
| 2013/0307469 A1 | 11/2013 | Kuroda et al. |
| 2015/0115725 A1* | 4/2015 | Kang ...................... H01F 38/14 |
| | | 307/104 |

FOREIGN PATENT DOCUMENTS

| | | |
|---|---|---|
| KR | 10-2013-0112226 A | 10/2013 |
| KR | 10-2014-0011076 A | 1/2014 |
| KR | 10-1385152 B1 | 4/2014 |

* cited by examiner

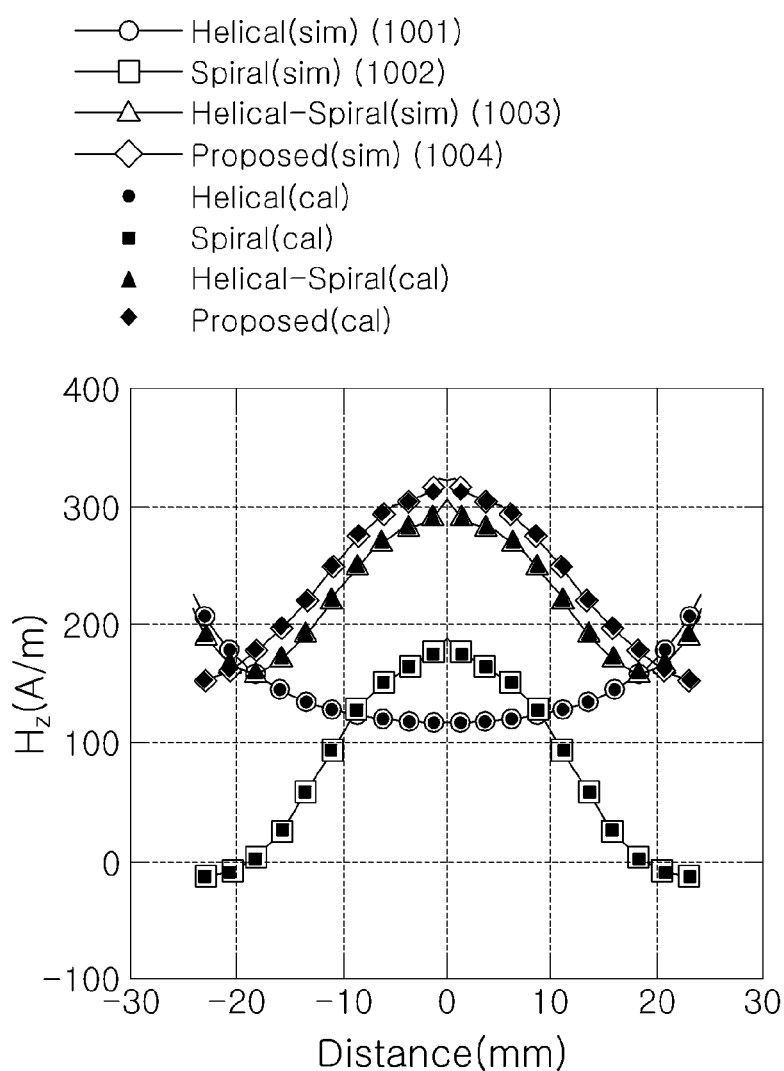

FIG. 37

| N | ro/W |
|---|---|
| 2 | 0.249923 |
| 3 | 0.142627 |
| 4 | 0.096026 |
| 5 | 0.070794 |
| 6 | 0.055284 |
| 7 | 0.044925 |
| 8 | 0.037589 |
| 9 | 0.032161 |
| 10 | 0.024742 |
| 11 | 0.024742 |
| 12 | 0.022118 |
| 13 | 0.01997 |
| 14 | 0.018185 |
| 15 | 0.016681 |
| 16 | 0.015399 |
| 17 | 0.014296 |
| 18 | 0.013338 |
| 19 | 0.0125 |
| 20 | 0.011761 |
| 21 | 0.011105 |
| 22 | 0.010521 |
| 23 | 0.009997 |
| 24 | 0.009524 |
| 25 | 0.009097 |
| 26 | 0.008709 |
| 27 | 0.008355 |
| 28 | 0.008031 |
| 29 | 0.007733 |
| 100 | 0.002865 |
| 200 | 0.002214 |
| 1000 | 0.001857 |

FIG. 39

| N | 1 | 2 | 3 | 4 | 5 | 6 | 7 | 8 | 9 | 10 | 15 | 20 |
|---|---|---|---|---|---|---|---|---|---|----|----|----|
| $p(2r_0)$ | 1.000 | 1.0870 | 1.2987 | 1.4085 | 1.5152 | 1.5873 | 1.6393 | 1.6667 | 1.7241 | 1.8182 | 1.8182 |
| $\Omega/m$ | 0.1743 | 0.2388 | 0.2912 | 0.31518 | 0.3370 | 0.3496 | 0.3619 | 0.3700 | 0.3781 | 0.4013 | 0.4152 |

APPARATUS FOR WIRELESS POWER TRANSFER, APPARATUS FOR WIRELESS POWER RECEPTION AND COIL STRUCTURE

CROSS-REFERENCE TO RELATED APPLICATIONS

The present application is a Continuation-In-Part of International Application No. PCT/KR2014/011398 filed on Nov. 26, 2014, which claims priority to Korean Patent Application No. 10-2014-0052704 filed on Apr. 30, 2014 and Korean Patent Application No. 10-2014-0118921 filed on Sep. 5, 2014, the disclosures of which are hereby incorporated in their entirety by reference.

TECHNICAL FIELD

The present invention generally relates to a wireless power transmitting device, a wireless power receiving device, and a coil structure. More specifically, the present invention relates to wireless charging technology capable of wirelessly transmitting power from a wireless power transmitting device to one or more wireless power receiving devices effectively, based on non-radiative near-field magnetic coupling.

BACKGROUND ART

Generally, wireless power transmission technology based on near-field magnetic coupling is technology for wirelessly transmitting power from a power source having a constant frequency to an electronic device. When electric power is applied to a transmitting coil in the source, a non-radiative time-varying magnetic field is formed in certain space around the transmitting coil. Then, when a receiving coil is located within the formed magnetic field, voltage and current are induced to the receiving coil by the time-varying magnetic field, whereby power is wirelessly transmitted.

As an example of wireless power transmission technology, the battery of an electronic device such as a smart phone, a tablet PC, and the like, may be charged by simply placing the devices on a wireless charging pad that generates a time-varying magnetic field at high-frequency. Such wireless power transmission technology may provide high portability, convenience, and stability, compared with a conventional wired charging environment, which uses charging adapters. Besides the wireless charging of the electronic devices, the wireless power transmission technology is expected to substitute for existing wired power transmission in various fields including electric vehicles, a various wearable devices such as Bluetooth earphones and 3D smart glasses, home appliances, underground facilities, buildings, portable medical devices, robots, leisure devices, and the like.

Generally, a wireless power transceiver system using a non-radiative time-varying magnetic field includes a wireless power transmitting device, which has transmitting coils and supplies power using a wireless power transmission method, and a wireless power receiving device, which has receiving coils and charges battery cells using the power wirelessly supplied from the wireless power transmitting devices, or supplies power to various electric devices in real time.

Meanwhile, in such a wireless power transceiver system, the strength of magnetic coupling between transmitting coils and receiving coils may change according to various environmental variables such as the structure of the transmitting coils and the receiving coils concerning the transmitting coils, the geometric arrangement and positions of the transmitting coils and the receiving coils, and the like. When the strength of the magnetic coupling between the transmitting coils and the receiving coils is changed by the environmental variables, optimum conditions for transmitting and receiving power in the wireless power transceiver system may be changed. For example, depending on the position and arrangement of the receiving coil for the transmitting coil, a dead zone, in which the mutual inductance between the two coils becomes zero, may occur, and because induced current cannot be generated in the area in which the mutual inductance between the transmitting coil and the receiving coil is zero, the wireless power transmission may not be performed. Therefore, it is very important to minimize the dead zone in the wireless power transmission process.

Meanwhile, 3-dimensional wireless power transmission technology is technology capable of stable power transmission regardless of the position and arrangement of a receiving coil by reducing an area corresponding to a dead zone by allowing wireless power transmission although the receiver is located arbitrarily in geometry in 3-dimensional space having x, y, and z axes. Such 3-dimensional wireless power transmission technology is being researched mainly for power transmission to human implantable devices such as endoscopic capsules, pace makers, and the like; smart phones using secondary batteries; wireless headsets and wearable data communication equipment; and wearable medical health care devices.

FIG. 1 is a view illustrating an example of a three-axis receiving coil according to a conventional art. The example illustrated in FIG. 1 has been disclosed in "Wireless powering for a self-propelled and steerable endoscopic capsule for stomach inspection (Biosensors and Bioelectronics, vol. 25, pp. 845-851, 2009)" by R. Carta, G. Tortora, J. Thone, B. Lenaerts, P. Valdastri, A. Menciassi, P. Dario, and R. Puers.

The three-axis receiving coil 101 illustrated in FIG. 1 has a disadvantage in that a receiving circuit is complicated because rectifier circuits are included for each receiving coil when a wireless power transmission system is implemented.

FIG. 2 is a view illustrating an example of a transmitting coil in the form of an array according to a conventional art. The example illustrated in FIG. 2 has been disclosed in "A novel mat-based system for position-varying wireless power transfer to biomedical implants (IEEE Transactions on Magnetics, vol. 49, no. 8, pp. 4774-4779, August 2013)" by Q. Xu, H. Wang, Z. Gao, Z.-H. Mao, J. He, and M. Sun.

The array type transmitting coil 201 illustrated in FIG. 2 is capable of power transmission on a power transmission board, but it is difficult to be used when a receiver is slanted according to the transmitting coil.

Recently, a high efficient system using high-frequency AC signals of frequencies greater than several MHz is proposed to solve these problems with regard to wireless power transmission technology based on near-field magnetic coupling. The high efficient system may efficiently transmit power over several meters by using a frequency range of higher than several MHz and by applying self-resonant coils of a high Q-factor by decreasing the resistance loss of a coil.

Meanwhile, in order to implement a high-efficiency wireless power transmission system using a frequency range of several MHz, it is important to design low-loss coils in terms of transmission efficiency. However, during wireless power transmission in a frequency range higher than several MHz, a skin effect, in which current is concentrated in the outer layer of a conducting wire because of eddy currents, is caused. Also, when the spacing between wires is decreased and the number of turns of the wire is increased to enhance the strength of a magnetic field, a proximity effect caused by magnetic field that is generated by neighboring wires, may cause the distribution of current to be constrained to a certain area of the wire.

DISCLOSURE

Technical Problem

Accordingly, the present invention has been made keeping in mind the above problems, and an object of the present invention is to provide a wireless power transmitting device capable of effective wireless power transmission and a wireless power receiving device capable of effective wireless power reception, by minimizing a dead zone based on the improved structures of a first coil unit and a second coil unit. Also, another object of the present invention is to provide a wireless power transceiver system in which wireless charging may be performed even though transmitting coil and a receiving coil are not aligned in geometry, and in which wireless power transmission may be simultaneously performed for multiple receiving devices.

A further object of the present invention is to provide a wire-winding method for increasing the strength of magnetic field and decreasing the loss resistance of a coil in order to raise transmission efficiency in wireless power transmission, and to provide a coil structure in which such a wire-winding method is applied.

Technical problems to be solved in the present invention are not limited to the above-mentioned technical problems, and other technical problems may be understood by those skilled in the art included in the present invention from the following descriptions.

Technical Solution

In order to achieve the above objects, according to one aspect of the present invention, there is provided a wireless power transmitting device. The wireless power transmitting device may include a bowl-shaped transmitting device body; and a transmitting coil unit for wirelessly transmitting power to a receiving device. The transmitting coil unit includes a multi-loop coil unit such as a spiral-like coil wound in a bottom of the transmitting device body; and a helical coil unit wound around a side wall of the transmitting device body, and wound to increase a radius of a coil loop in a direction to an upper part, wherein the transmitting device body is configured such that, in an interior area defined thereby, the whole or a part of a receiving device for receiving wireless power from the wireless power transmitting device is located and receives wireless power from the wireless power transmitting device.

The helical coil unit may be extended from an end of the multi-loop coil unit. The helical coil may range in gradient from an angle of 5 degrees to an angle of 90 degrees with regard to the bottom surface.

The helical coil unit may have any shape corresponding to the surface of the bowl-shaped transmitting device body. The transmitting coil unit may perform control based on a strength of receiving magnetic field when an arrangement of a receiving coil unit is parallel with the transmitting coil unit or perpendicular to the transmitting coil unit, according to an environment condition in which a magnetic flux density interlinked with the receiving coil unit of the receiving device becomes maximum or minimum.

The wireless power transmitting device may further include a source coil unit for transmitting power to the transmitting coil unit by being supplied with the AC signal from the AC source. The wireless power transmitting device may further include one or more matching units for controlling impedance matching in the transmitting coil unit depending on a load of the receiving devices. The matching unit may include a transmitting coil for transmitting power to the transmitting coil unit by being supplied with the power from the power source, and a source coil unit separated from the transmitting coil.

An end of at least one of the multi-loop coil unit and the helical coil unit may be connected to one or more capacitors in series or in parallel. At least one of the multi-loop coil unit and the helical coil unit may be wound in a form of any one of a circular coil, a polygonal coil, and an elliptical coil.

For multiple wires forming the multi-loop coil unit and the helical coil unit, spacing between the wires may be determined based on a radius of a wire, a total width of the coil unit, and a number of turns of a coil. At least one of the multi-loop coil unit and the helical coil unit may be wound to make spacing between loops uniform.

The transmitting coil unit can transmit power simultaneously to multiple receiving devices having different load characteristics.

In order to achieve the above objects, according to one aspect of the present invention, there is provided a wireless power transmitting device. The wireless power transmitting device may include a bowl-shaped transmitting device body; and a transmitting coil unit for wirelessly transmitting power to a receiving device. The transmitting coil unit includes a multi-loop coil unit such as a spiral-like coil wound in a bottom of the transmitting device body; and a helical coil unit wound around a side wall of the transmitting device body, and wound to increase a radius of a coil loop in a direction to an upper part, wherein the multi-loop coil unit may be supplied with power from a first AC source, and the helical coil unit may be supplied with power from a second AC source. Sensing data of power received by the receiving device may be obtained. The wireless power transmission unit may further include a control unit for controlling output power of the first AC source and the second AC source based on the sensing data.

Among the multi-loop coil unit and the helical coil unit, the control unit may perform control for supplying more power to a coil unit that supplies more power to the receiving device or perform control for supplying less power to a coil unit that supplies less power to the receiving device.

The control unit may control the first alternating current (AC) source and the second alternating current source to supply predetermined power, and may receive the sensing data from the receiving device based on the control.

In order to achieve the above objects, according to another aspect of the present invention, there is provided a wireless power transmitting device.

The wireless power transmitting device may include a bowl body; a multi-loop coil unit for generating a magnetic field for supplying wireless power, from a bottom surface of the bowl body; and a helical coil unit for supplying wireless power. The wireless power transmitting device may generate a magnetic field for supplying wireless power to cover a wider spatial area compared to the case that the multi-loop coil unit and the helical coil unit are separately arranged, wherein a receiving device may be arranged in any direction.

The multi-loop coil unit is arranged in the bottom surface of the bowl body, and the helical coil unit is wound along the side wall of the bowl body, and may be wound to increase a radius of a coil loop in a direction to an upper part.

In order to achieve the above objects, according to a further aspect of the present invention, there is provided a wireless power receiving device. The wireless power receiving device may include a bowl-shaped receiving device body; and a receiving coil unit for receiving power supplied from a wireless power transmitting device. The receiving coil unit may include a multi-loop coil unit wound in a bottom surface of the receiving device body; and a helical coil unit wound around a side wall of the receiving device body, and wound to increase a radius of a coil loop in a direction to an upper part.

The helical coil unit may be extended from an end of the multi-loop coil unit. The receiving coil unit may further include one or more matching units for controlling impedance matching in the receiving coil unit depending on a load of the receiving device. The matching unit may include a receiving coil for receiving power from a transmitting coil unit and an impedance matching circuit forming a parallel resonance circuit of a load of the receiving device.

In order to achieve the above objects, according to still another aspect of the present invention, there is provided a coil structure. The coil structure includes a coil unit for transmitting or receiving wireless power, and in the coil unit, multiple wires are arranged with identical spacing. A distance between centers of the adjacent wires may be determined based on a skin effect in the wire and a proximity effect between the adjacent wires.

The coil unit is at least one of a multi-loop coil and a helical coil, and a single wire with a circular cross section is wound in multiple turns with identical spacing, a number of the turns being identical to a number of the multiple wires in the predetermined section.

The distance between the centers of the adjacent wires, p is $(W-2r_0)/(N-1)$, where p denotes the distance between the centers of the adjacent wires, $r_0$ denotes a radius of the wire, W denotes a total width of the coil unit, and N denotes a number of the wires.

A ratio of a radius of the wire to a total width of the coil unit may be in a range from 0.0018 to 0.25. The distance between the centers of the adjacent wires may be determined based on minimum resistance per unit length according to a number of the wires, N.

A radius of the wire with a circular cross section, a total width of the coil unit, and a number of the wires may satisfy "$r_0/W=\alpha N^{\beta}+\gamma$". Here, $\alpha=0.6534$, $\beta=-1.397$, and $\gamma=0.001815$.

In order to achieve the above objects, according to a further aspect of the present invention, there is provided a wireless power receiving device. The wireless power receiving device may include a box-shaped receiving device body; and a receiving coil unit for receiving power supplied from a wireless power transmitting device. The receiving coil unit may include a multi-loop coil unit wound in a bottom of the receiving device body in rectangular shape; and a helical coil unit wound around a side wall of the receiving device body.

The above embodiments are merely a part of the preferred embodiments of the present invention, and various embodiments to which technical features of the present invention are applied may be understood by those skilled in the art, based on the following detailed description of the present invention.

Advantageous Effects

According to an embodiment of the present invention, the present invention allows wireless charging even though the locations of a transmitting coil and a receiving coil are not aligned, and may provide a wireless power transceiver system capable of simultaneously transmitting power to multiple receiving devices.

Also, according to an embodiment of the present invention, it is possible to provide a wireless power transmitting device in which a dead zone is minimized based on the improved structures of a horizontal coil unit and a vertical coil unit, and a wireless power receiving device having a structure capable of effectively interworking with the wireless power transmitting device.

Also, according to an embodiment of the present invention, a wire-winding method for increasing the strength of a magnetic field and decreasing the loss resistance of a coil may be provided to raise the transmission efficiency.

DESCRIPTION OF DRAWINGS

The accompanying drawings, included as a part of a detailed description to help the understanding of the present invention, provide an embodiment of the present invention and describe the technical ideas of the present invention with the detailed description.

FIG. 11a and FIG. 11b are views illustrating another example of the result of a simulation that compares the strength of magnetic fields in a general transmitting coil and in a 3-dimensional wireless power transmitting coil according to an embodiment of the present invention;

FIG. 37 represents the ratio of the radius of a wire to the total width of a coil unit for minimizing loss resistance depending on the number of turns N of the coil unit;

FIG. 39 shows the value of $p/2r_0$ for minimum loss resistance according to the number of turns N;

BEST MODE

The present invention may be variously changed, and may have various embodiments, and specific embodiments will be described in detail below with reference to the attached drawings. Descriptions of known functions and configurations which have been deemed to make the gist of the present invention unnecessarily obscure will be omitted below.

Hereinafter, the embodiments of the present invention will be described in detail with reference to the accompanying drawings. The following description disclosed with the accompanying drawings is intended to describe an exemplary embodiment of the present invention rather than a sole embodiment of the present invention. The following description includes concrete details to provide the complete understanding of the present invention. However, those skilled in the art will understand that the present invention may be embodied without such concrete details.

Figure 1:
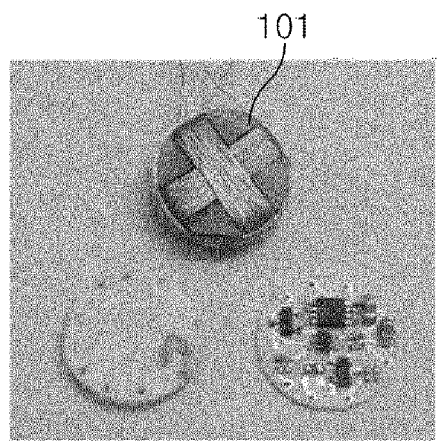
FIG. 1 is a view illustrating an example of a three-axis receiving coil according to a conventional art.
Figure 2:
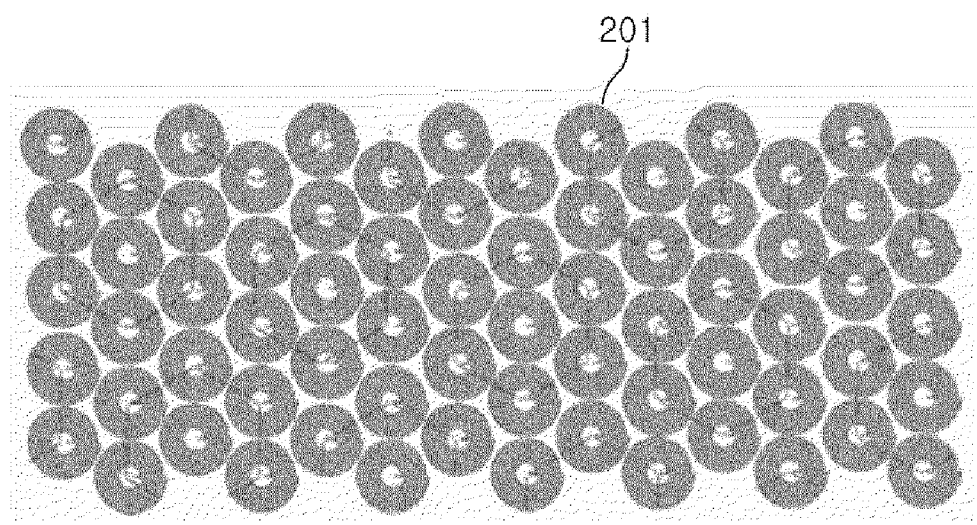
FIG. 2 is a view illustrating an example of a transmitting coil in the form of an array according to a conventional art.
Figure 3:
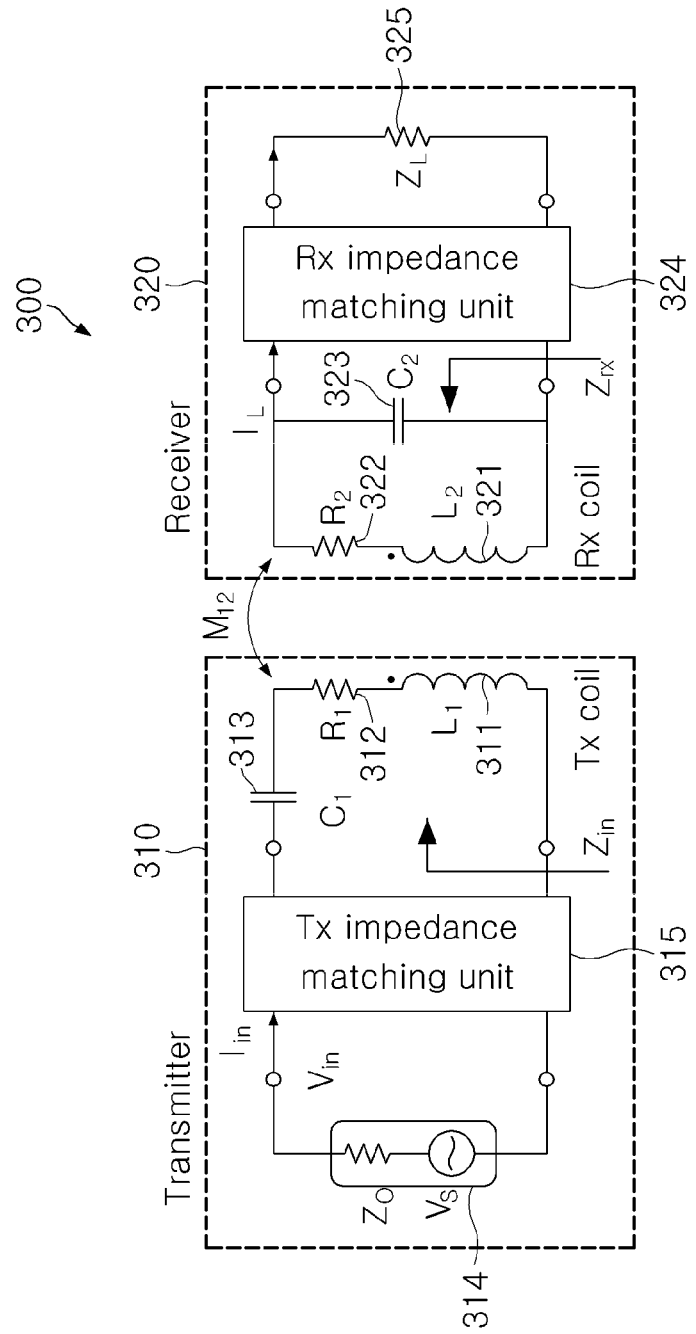
FIG. 3 is a view illustrating an example of a circuit configuration for describing the concept of a wireless power transceiver system according to an embodiment of the present invention.

FIG. 3 is a view illustrating an example of a circuit configuration for describing the concept of a wireless power transceiver system according to an embodiment of the present invention.

Referring to FIG. 3, the equivalent circuit 300 of a wireless power transceiver system according to an embodiment of the present invention includes transmitter-side resonant coils (hereinafter, referred to as 'transmitter' 310), which are being supplied with an AC source signal $V_S$ 314, and receiver-side resonant coils (hereinafter, referred to as 'receiver' 320), and may transmit wireless power using magnetic induction or magnetic coupling, according to mutual inductance $M_{12}$ between the transmitter 310 and the receiver 320.

The transmitter 310 includes a self-inductance $L_1$ 311, a resistor $R_1$ 312, and a capacitor $C_1$ 313 for resonance. The receiver 320 includes a self-inductance $L_2$ 321, a resistor $R_2$ 322, and a capacitor $C_2$ 323 for resonance.

The circuit diagram of FIG. 3 illustrates a series circuit in which the capacitor $C_1$ 313 of the transmitter 310 is connected to the inductance $L_1$ 311 and the resistor $R_1$ 312 in series, but the circuit is not limited to this example. According to another embodiment, the capacitor $C_1$ 313 of the transmitter 310 may be connected to the inductance $L_1$ 311 and the resistor $R_1$ 312 in parallel. Similarly, a series circuit in which the capacitor $C_2$ 323 of the receiver 320 is connected to the inductance $L_2$ 321 and the resistor $R_2$ 322 in parallel is illustrated, but the circuit is not limited to this example. According to another embodiment, the capacitor $C_2$ 323 may be connected to the inductance $L_2$ 321 and the resistor $R_2$ 322 in series.

Desirably, the equivalent circuit 300 of the wireless power transceiver system according to an embodiment of the present invention further includes impedance matching units in the transmitter 310 and the receiver 320, namely, a Tx impedance matching unit 315 and an Rx impedance matching unit 324 to enable the transmitting coil to transmit maximum power to the receiving coil through electromagnetic induction or magnetic coupling.

For maximum power transmission, the Tx impedance matching unit 315 serves to make no reactance of impedance looking into the Tx coil from the impedance matching unit, that is, imaginary of the impedance looking into the Tx coil from the impedance matching unit zero. Also, the matching unit minimizes or eliminates the reflections of source signals transmitted through the transmitter impedance matching. The Rx impedance matching unit 324 satisfies the condition for conjugate matching between the impedance Zrx and that looking into a load $Z_L$ 325 from the Rx coil. In this case, the impedance $Z_L$ 325 means a load such as a rectifier circuit, a DC-DC converter, a battery, a resistor, an electrical device, and the like.

In the preferred embodiment of the present invention, the receiver 320 and the transmitter 310 for receiving and transmitting wireless power, illustrated in FIG. 3, may respectively correspond to small devices and a device with a supporting stand, which transmits maximum power to the small devices. For example, the receiver 320 may be small medical devices such as a hearing aid, portable data communication devices such as a smart phone, all wearable electronic devices having rechargeable batteries, and various peripherals concerned with the above-mentioned devices. The transmitter 310 may be a supporting means or a storage means, which may supply wireless power to the receiver 320 in maximum transmission efficiency. A new coil structure proposed in the present invention may be applied to at least one of the Tx coil of the transmitter 310 and the Rx coil of the receiver 320.

The coil structure of the transmitter or the receiver according to an embodiment of the present invention includes planar multi-loop coil such as spiral coil in which a wire is wound flatways on a 2-dimensional plane, and helical loops in which a wire is wound in three dimensions from the plane on which the planar multi-loop are formed. Based on this structure, a dead zone, in which induced current from the transmitting coil to the receiving coil is not generated, may be minimized in the 3-dimensional wireless power transmission.

The planar multi-loop coil may be a coil unit in which coils are wound in a spiral-like form on a 2-dimensional plane, for example, on the x-y axis plane of x, y, and z space. The planar multi-loop coil may be implemented in various forms including a circular spiral coil in which the planar form of each loop coil is a circle, a polygonal spiral coil in which the planar form of each loop coil is a polygon, an elliptical spiral coil in which the planar form of each loop coil is an ellipse, and the like.

The helical loops have the form of a helix coil, namely, coils are wound to the vertical direction from the plane on which the planar multi-loop coils are implemented, for example, in the z-axis direction in x, y, and z space. The helical loops may be implemented in various forms including a circular helical coil in which the planar form of each loop coil is a circle, a polygonal helical coil in which the planar form of each loop coil is a polygon, an elliptical helical coil in which the planar form of each loop coil is an ellipse, and the like.

Mode for Invention

Hereinafter, various embodiments for a coil structure according to an embodiment of the present invention will be described in detail.

Figure 4:
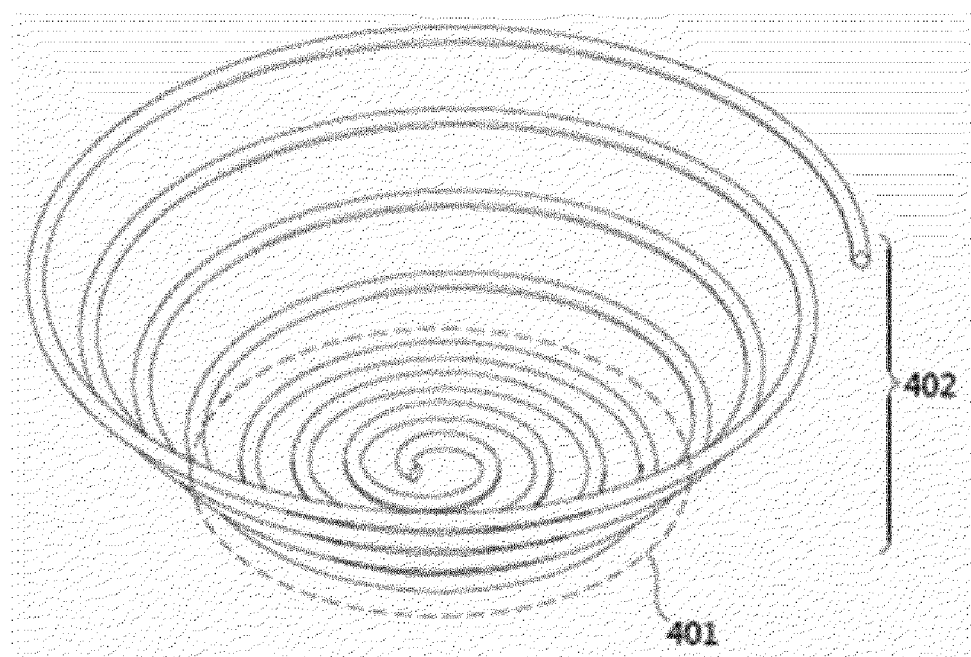
FIG. 4 is a perspective view illustrating an example of a coil structure according to an embodiment of the present invention.
Figure 5:
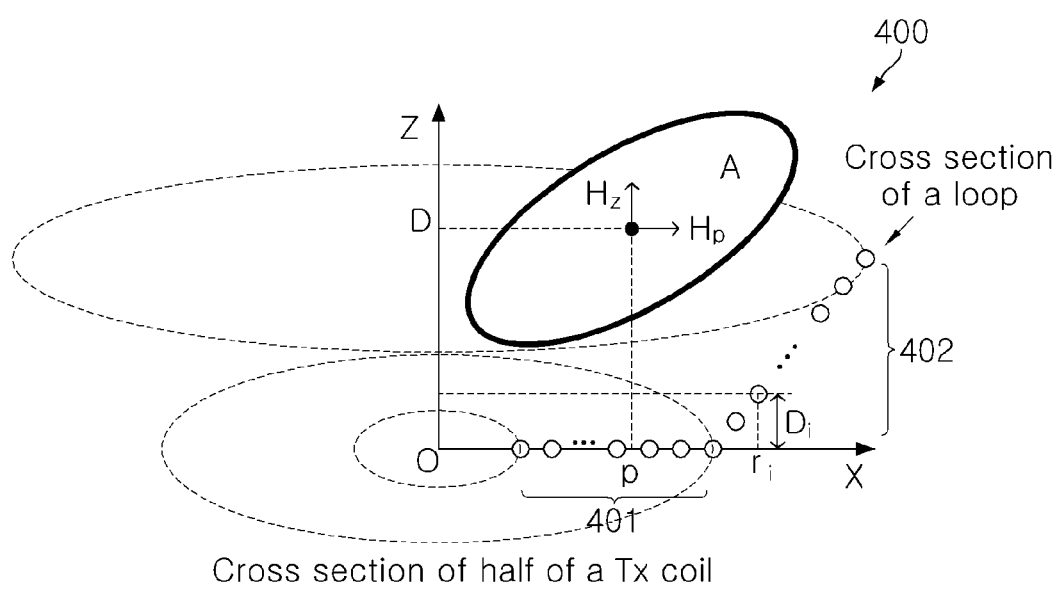
FIG. 5 is an exemplary view for describing the coil structure illustrated in FIG. 4.

FIG. 4 is a perspective view illustrating an example of a coil structure according to an embodiment of the present invention, and FIG. 5 is an exemplary view for describing the coil structure illustrated in FIG. 4. Specifically, the views illustrate an example of the structure of a 3-dimensional wireless power transmitting coil for minimizing a dead zone in wireless power transmission.

A transmitting coil 400 according to an embodiment of the present invention, illustrated in FIGS. 4 and 5, may include a multi-loop coil unit 401 formed as a circular spiral coil on a 2-dimensional plane, for example, on the floor, and a helical coil unit 402 having a conical-like form, in which a coil is wound to the vertical direction from the plane on which the multi-loop coil unit is formed but the radius of the coil loop steadily increases.

In this case, the multi-loop coil unit 401 and the helical coil unit 402 forming the transmitting coil 400 may use a single wire to be used in a band of several MHz. For example, the helical coil unit 402 may be formed by extending the end of the outermost loop of the multi-loop coil unit 401. The multi-loop coil unit 401 and the helical coil unit 402 have the wire with an identical radius, and may be implemented in a structure having multiple turns.

When such a structure having multiple turns is implemented, desirably, the spacing between each turn may be identical to have lowest resistance. The technique for determining the spacing between each turn to have minimum resistance will be described in detail in a description with reference to FIGS. 24 to 41.

Figure 6:
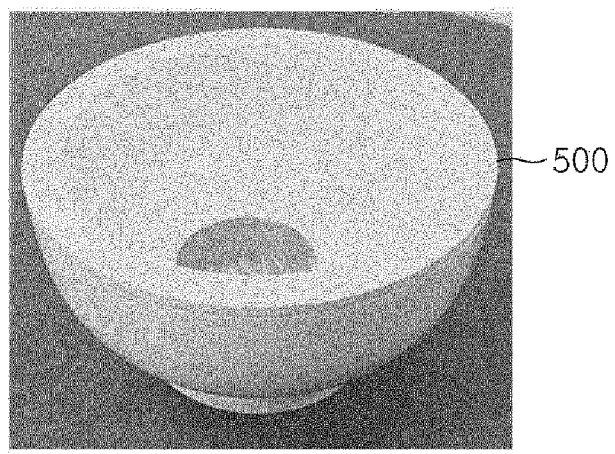
FIG. 6 is a view illustrating an example of the mechanical form of a bowl-shaped transmitter to which the structure of the wireless power transmitting coil illustrated in FIGS. 4 and 5 is applied.

As illustrated in FIG. 5, magnetic field H is generated in the inside area A of a coil by the structural form of the multi-loop coil unit 401 and the helical coil unit 402. FIG. 6 is a view illustrating an example of the mechanical form of a bowl-shaped transmitter to which the structure of the wireless power transmitting coil illustrated in FIGS. 4 and 5 is applied.

Referring to FIG. 6, the transmitter 500 according to an embodiment of the present invention presents a circular bowl-shaped transmitter in which the transmitting coils illustrated in FIGS. 4 and 5 are wound and mounted in the bottom surface and the side wall of the bowl-shaped transmitter.

Figure 7:
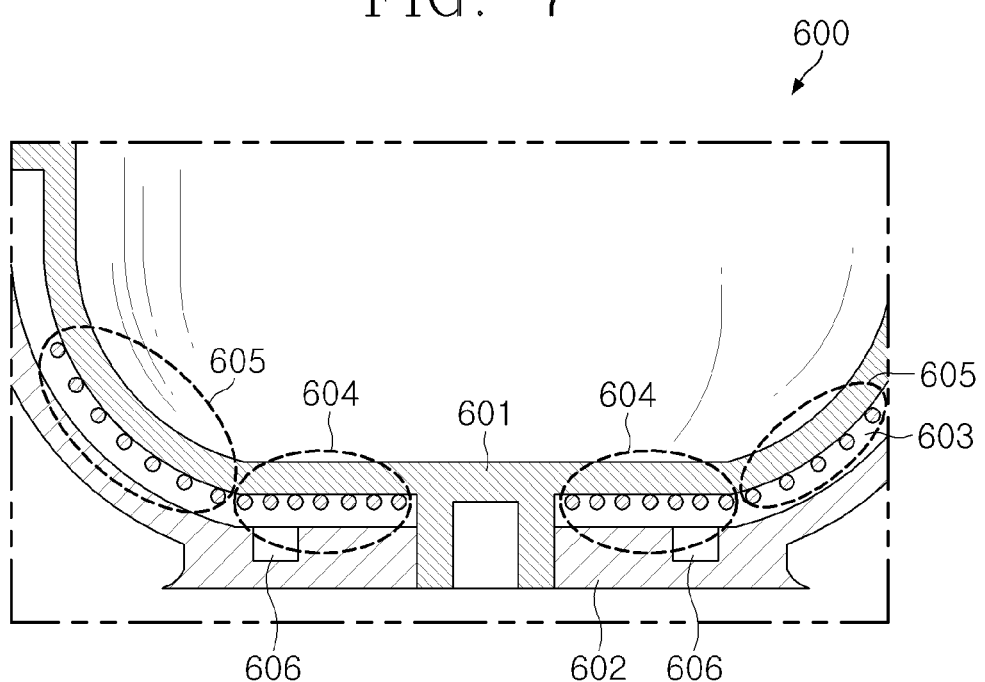
FIG. 7 is a view illustrating an example of the cross section of the circular bowl-shaped transmitter illustrated in FIG. 6.

FIG. 7 is a view illustrating an example of the cross section of the circular bowl-shaped transmitter illustrated in FIG. 6.

Referring to FIG. 7, the main body 600 of a transmitter according to an embodiment of the present invention includes a first case 601 forming the inside of the bowl shape, and a second case 602 that is joined to the first case and forms the outside of the bowl shape. In this case, as an embodiment, projections are formed in the lower part of the first case 601 and grooves, into which the projections are inserted, are formed in the lower part of the second case 602, whereby the projections are inserted into the grooves and thus the first case 601 may be stuck to the second case 602.

A first groove 603, which is an area in which a transmitting coil will be wound, is formed between the joined first case 601 and second case 602. The multi-loop coil unit 604 is wound flatways in the bottom surface of the first case 601, specifically, within the area of the first groove 603. The helical coil unit 605 is extended from the multi-loop coil unit 604, and is wound along the outer circumference surface of the side of the first case 601 in a helical form. For example, the end of the outermost coil of the multi-loop coil unit 604 may be connected with the end of the bottommost coil of the helical coil 605.

Meanwhile, a second groove 606 in which a coil is wound may be formed in the lower part of the second case 602, and this groove may be used as space in which the source coil of a transmitter, which will be described later, will be wound.

For example, the second case 602 is separated from the first case 601 in a certain part thereof to form the first groove 603, and a transmitting coil is stuck to the first case 601 and the inner surface of the second case may be used for adhesion of a shielding material.

When the bowl-shaped transmitter illustrated in FIGS. 6 and 7 is used, a receiver may be placed in the transmitter, whereby the storage and charging of the receiver may be simultaneously performed. For example, the receiver is implemented as a hearing aid, and the bowl-shaped transmitter may be implemented as a storage box for the hearing aid. In this case, the charging of the hearing aid may be performed simultaneously with the storage thereof by storing the one or two hearing aids in the hearing aid storage box.

When a receiver is inside the transmitting coil, magnetic field is interlinked with a receiving coil within the receiver, and thus induced current may be generated. Therefore, for the design of a transmitting coil according to an embodiment of the present invention assumes an environment in which the magnetic flux density interlinked with a receiving coil is maximum or minimum, the strength of magnetic field when the receiving coil is parallel or perpendicular to the transmitting coil is calculated and the structure of the transmitting coil capable of controlling the magnetic field depending on the calculated strength is proposed.

For example, a designer may implement the desired magnetic field pattern by controlling the number of turns of the transmitting coil or the spacing between wires, the tilted angle of the conical-like helical coil, and the like.

The following equations 1 and 2 show the strength of a magnetic field in a transmitting coil according to an embodiment of the present invention, which was described with reference to FIG. 5.

$$H_{z,i} = \frac{I}{2\pi\rho}\left(\frac{m_i}{4r_i\rho}\right)^{1/2}\left(\rho K_i + \frac{r_i m_i - (2 - m_i)\rho}{2 - 2m_i}E_i\right) \quad \text{[Equation 1]}$$

$$H_{\rho,i} = \frac{(D - D_i)I}{2\pi\rho}\left(\frac{m_i}{4r_i\rho}\right)^{1/2}\left(-K_i + \frac{2 - m_i}{2 - 2m_i}E_i\right) \quad \text{[Equation 2]}$$

The above equations 1 and 2 show the strength $H_{z,i}$ of magnetic field generated in the z direction and the strength $H_{\rho,i}$ of magnetic field generated in the $\rho$ direction when current I flows in the i-th loop of a transmitting coil. $D_i$ denotes the height in the z direction of the i-th loop, $\rho$ denotes the spacing in the $\rho$ direction at a certain point, D denotes the height of the center of a Rx coil in the z direction, and $r_i$ denote the radius of the loop forming the i-th loop. Here, $K_i$ and $E_i$ are a complete elliptic integral of the first kind and a complete elliptic integral of the second kind, respectively, and they are calculated by the following equations 3 and 4.

$$K_i = \int_0^{\pi/2} \frac{d\theta}{(1 - m_i\sin^2\theta)^{1/2}} \quad \text{[Equation 3]}$$

$$E_i = \int_0^{\pi/2} (1 - m_i\sin^2\theta)^{1/2}\,d\theta \quad \text{[Equation 4]}$$

In the above equations 3 and 4, $m_i$ is obtained by the following equation 5.

$$m_i = \frac{4r_i\rho}{(D - D_i)^2 + (r_i + \rho)^2} \quad \text{[Equation 5]}$$

Therefore, the the total magnetic field in the z direction $H_z$ and the total magnetic field $H_\rho$ in the $\rho$ direction, generated from the transmitting coil having N turns, may be represented as the following equations 6 and 7, respectively.

$$H_z(\rho, D) = \sum_{i=1}^{N} H_{z,i}(\rho, D) \quad \text{[Equation 6]}$$

$$H_\rho(\rho, D) = \sum_{i=1}^{N} H_{\rho,i}(\rho, D) \quad \text{[Equation 7]}$$

Figure 8:
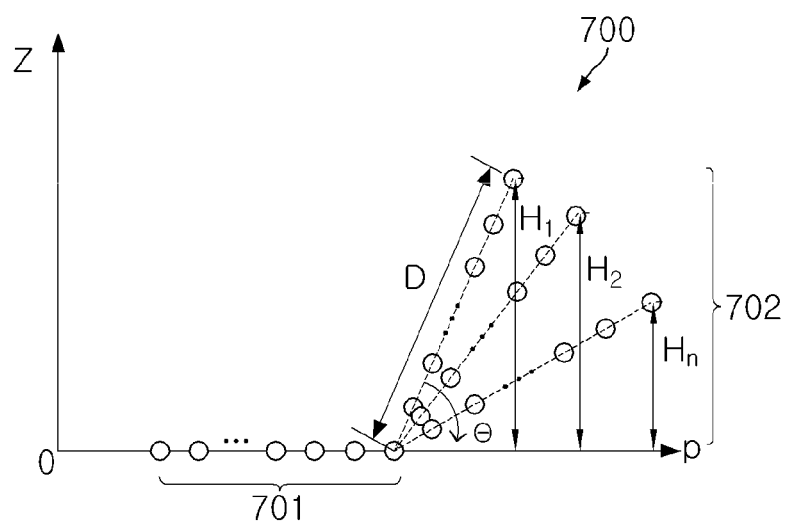
FIGS. 8 and 9 are views illustrating various embodiments of the shape of a coil unit according to an embodiment of the present invention, and show the embodiments in which the gradient of a helical coil unit is variously controlled in the 3-dimensional wireless power transmitting coil.
Figure 9:
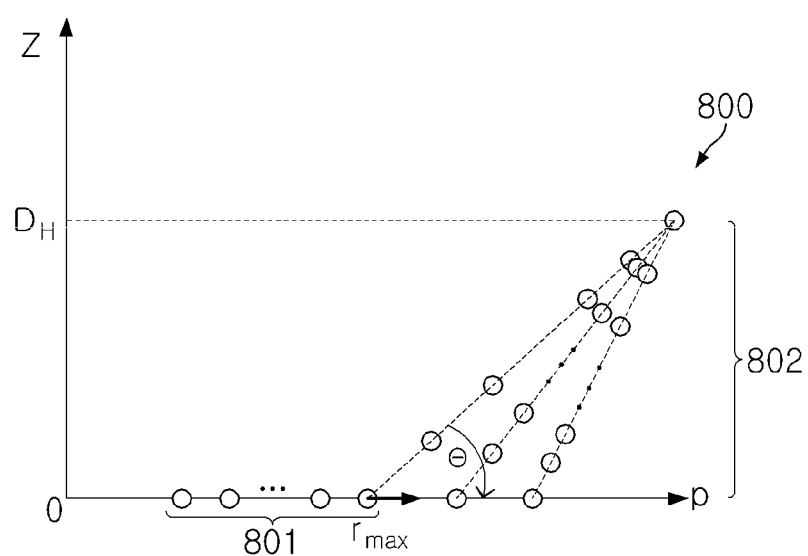

Next, FIGS. 8 and 9 are views illustrating various embodiments of the shape of a coil unit according to an embodiment of the present invention, and show the embodiments in which the gradient of a helical coil unit is variously controlled in the transmitting coil.

Referring to FIG. 8, a transmitting coil 700 according to another embodiment of the present invention comprises a multi-loop coil unit 701 and a helical coil unit 702. When the outer radius of the multi-loop coil unit 701 is fixed and the length D of the helical coil unit 702 is maintained to be constant, the gradient 8 of the helical coil unit from the bottom may be controlled within a range of 5° to 90°. Because the gradient is changed under the condition in which the length of the helical coil unit 702 is maintained to be constant, the height of the helical coil unit 702 is changed to $H_1, H_2, \ldots, H_n$.

Meanwhile, a transmitting coil 800 according to a further embodiment of the present invention, illustrated in FIG. 9, variously adjusts the gradient 8 within a range of 5° to 90° when the height $D_H$ of the helical coil unit 802 is fixed. Accordingly, the radius $r_{max}$ of the multi-loop coil unit 801 may be adjusted depending on the gradient of the helical coil unit 802.

Figure 10A:
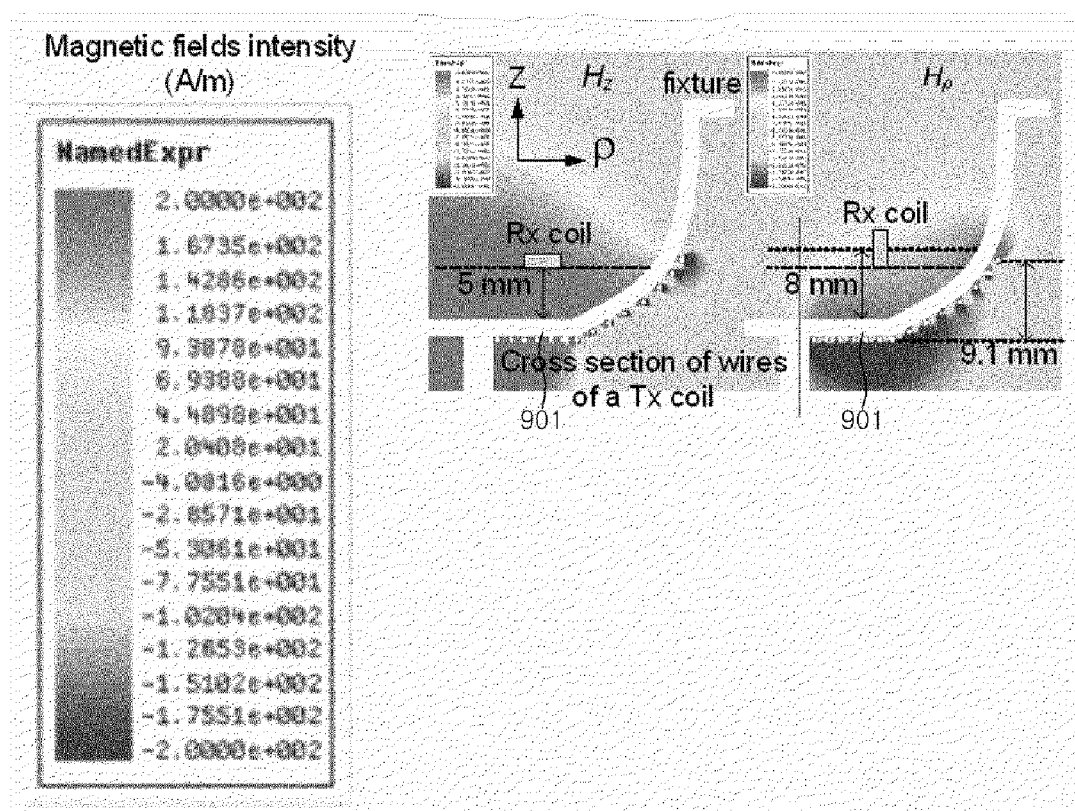
FIG. 10a, FIG. 10b and FIG. 10c are views illustrating the result of a simulation that compares the strength of magnetic fields in a general transmitting coil and in a 3-dimensional wireless power transmitting coil according to an embodiment of the present invention.
Figure 10B:
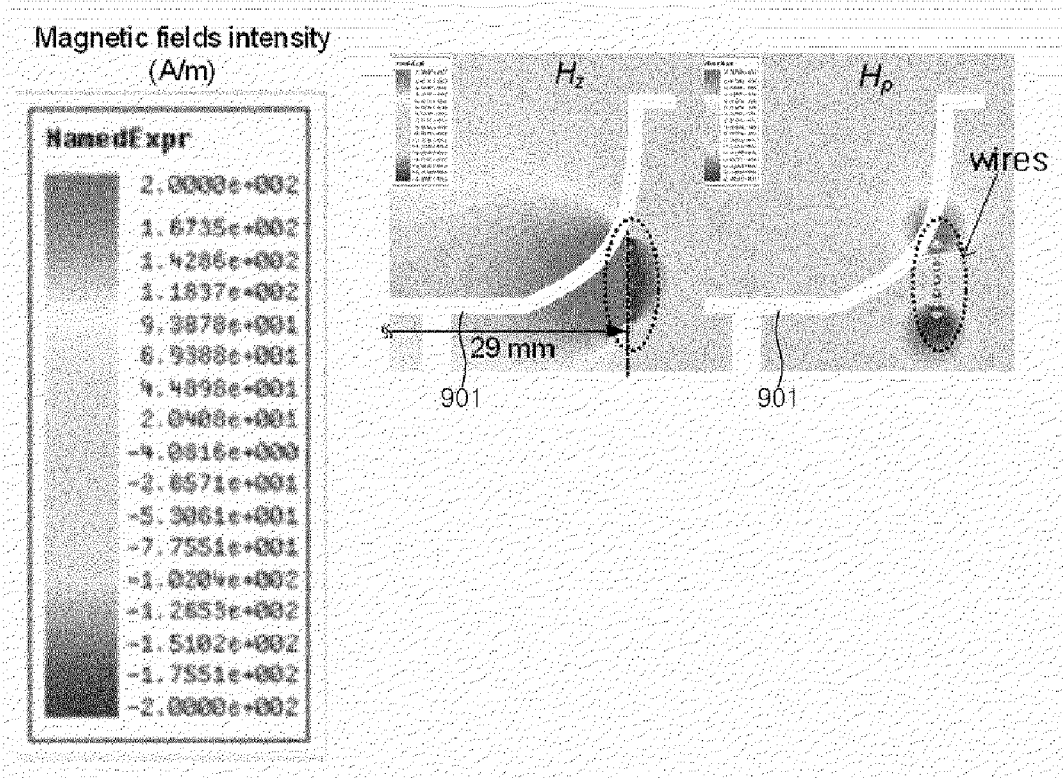
Figure 10C:
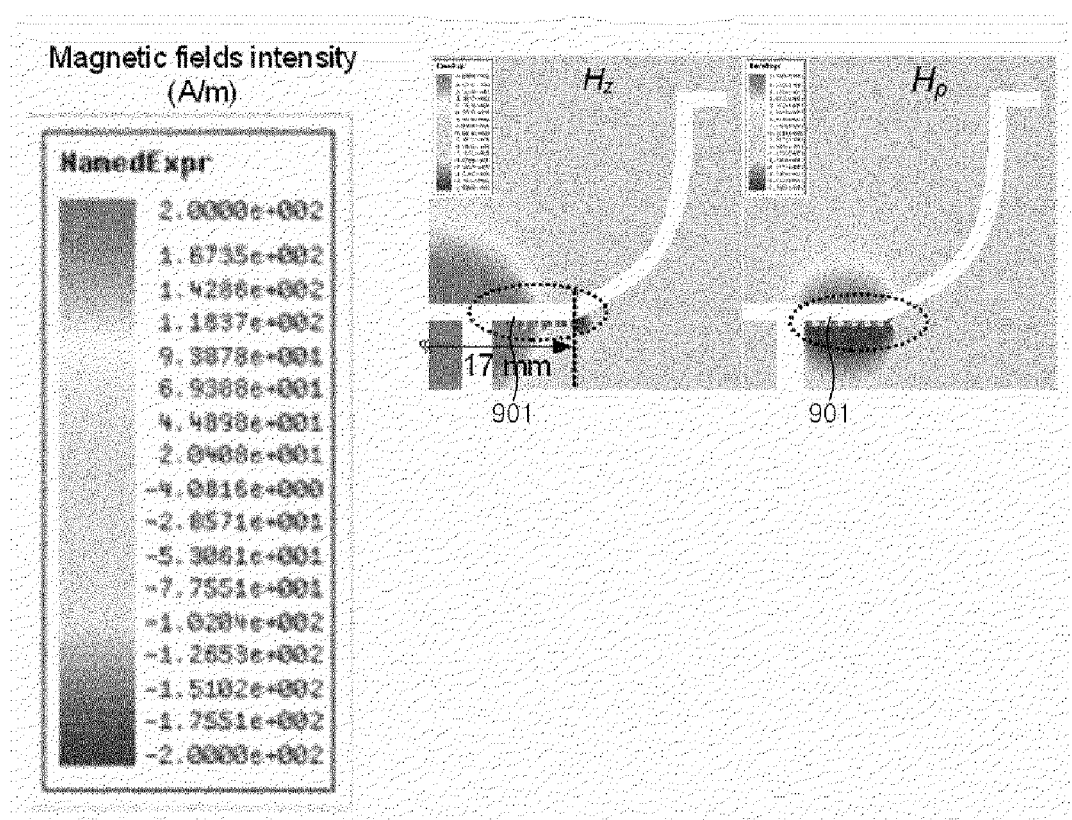

FIG. 10a, FIG. 10b and FIG. 10c are views illustrating the result of a simulation that compares the strength of magnetic field in conventional transmitting coils and in the proposed bowl-shaped transmitting coil according to an embodiment of the present invention.

FIG. 10a shows the strength of magnetic field of a bowl shaped transmitting coil according to an embodiment of the present invention, FIG. 10b shows the strength of magnetic field of a general helical coil only, and FIG. 10c shows the strength of magnetic field of a general spiral coil only. In each of the drawings, the left side represents the strength of magnetic field in the $H_z$ direction to the coil structure, and the right side represents the strength of magnetic field in the $H_\rho$ direction to the coil structure.

Also, the white area 901 in FIG. 10a, FIG. 10b and FIG. 10c is a supporting means for supporting the transmitting coil, and represents the cross section of a bowl-shaped transmitter that functions as the storage of a receiver, as illustrated in FIGS. 6 and 7.

Specifically, the left drawing in FIG. 10a represents the result of a simulation for the strength of a magnetic field when a receiving coil is horizontally placed 5 mm away from the bottom (D=5 mm), and the right drawing represents the result of a simulation for the strength of a magnetic field when the receiving coil is vertically placed 8 mm away from the bottom (D=8 mm).

The result of the simulation for the magnetic field from the transmitting coil, exemplified by FIG. 10a, FIG. 10b and FIG. 10c, shows the strength of the magnetic field when the wire diameter is 0.64 mm and 1 A of current is applied. In the coil used in FIG. 10a, according to an embodiment of the present invention, the height of the coil is 9.1 mm, the spacing between each wire of the spiral loop is 1.5 mm, and the spacing between each wire of the conical-like helical loop in the side is 2.14 mm. The helical coil in FIG. 10b and the spiral coil in FIG. 10c are coils having seven turns, the spacing between each turn of the coils is 1.5 mm, and the maximum diameter of the coils are respectively 29 mm and 17 mm.

According to the strength of the magnetic field illustrated in FIG. 10a, FIG. 10b and FIG. 10c, in the magnetic field area generated from the wireless power transmitting coil according to an embodiment of the present invention, the magnetic field area generated from the general helical coil, and the magnetic field area generated from the spiral coil, the area expressed in red represents an area in which the magnetic field is strong in the positive (+) direction, and the area expressed in blue represents an area in which the magnetic field is strong in the negative (−) direction.

When comparing FIG. 10a with FIG. 10b and FIG. 10c, the magnetic field $H_z$ illustrated in the left side of FIG. 10a, which was generated by the structure of a bowl-shaped coil in which the spiral coil and the conical helical coil are joined, is formed in an area wider than the area that adds the area of the magnetic field generated only by the helical coil unit as illustrated in FIG. 10b to the area of the magnetic field generated only by the multi-loop coil unit as illustrated in FIG. 10c. In other words, when only a spiral coil is used, the magnetic field strength $H_z$ is very low near the outermost of the spiral coil. In this case, as shown in the left drawing of FIG. 10b, a constant or uniform magnetic field $H_z$ may be obtained on the surface on which the receiver is placed, by using the magnetic field $H_z$ generated by the conical helical coil.

Also, the magnetic field $H_\rho$ illustrated in the right side of FIG. 10a, which was generated by the coil structure, is formed in an area wider than the area that adds the area of the magnetic field generated only by the helical coil unit as illustrated in FIG. 10b to the area of the magnetic field generated only by the multi-loop coil unit as illustrated in FIG. 10c. Therefore, the structure of the bowl-shaped coil may create a synergy effect attributable to the combination of the spiral coil and conical helical coil.

Figure 11B:
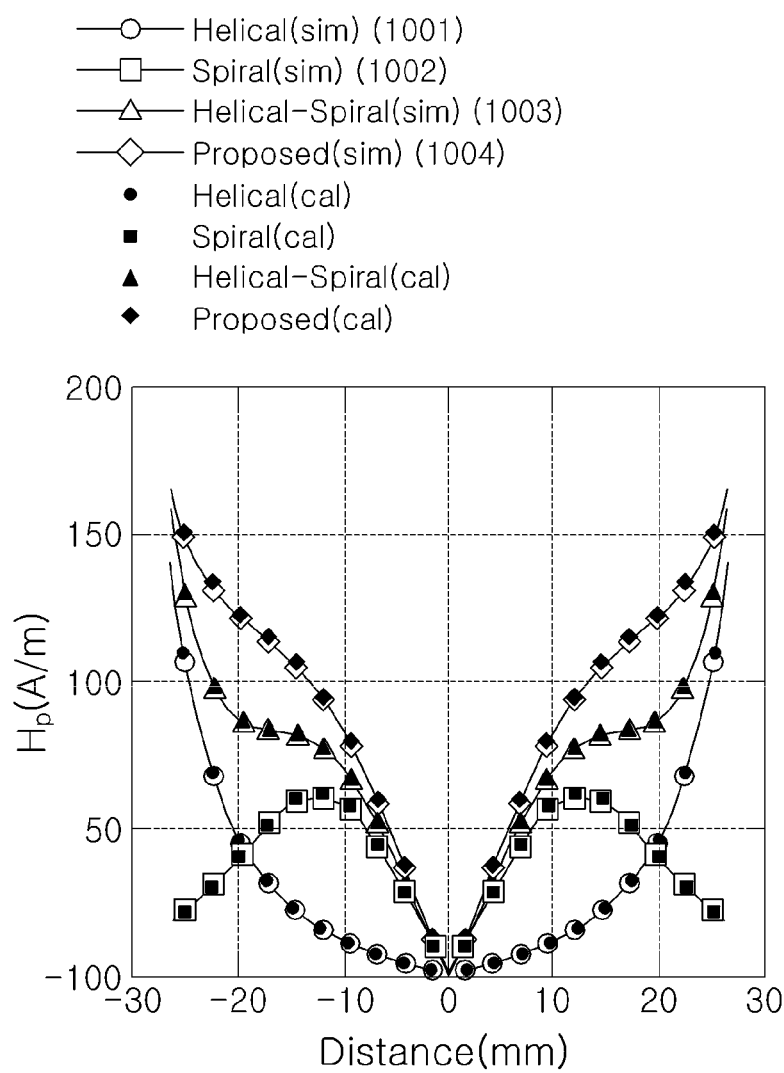

FIG. 11a and FIG. 11b are views illustrating another example of the result of a simulation that compares the strength of magnetic fields in a conventional transmitting coil such as a spiral coil and a helical coil and in a bowl-shaped transmitting coil according to an embodiment of the present invention.

The graph of a bowl-shaped transmitting coil, illustrated in FIG. 11a and FIG. 11b, represents a result of comparison of the strength of a magnetic field in the z direction and the strength of a magnetic field in the ρ direction in a first transmitting coil 1001 comprising a helical coil, in a second transmitting coil 1002 comprising a spiral coil, in a third transmitting coil 1003 comprising a cylinder-shaped helical coil unit and a multi-loop coil unit, and in a fourth transmitting coil 1004 that comprises a conical helical coil unit and a multi-loop coil unit according to an embodiment of the present invention and controls the strength of magnetic field.

Here, the solid line denotes the result of a simulation (sim), and multiple dots on the solid line denote the results of calculation (cal) for each of the coil structures.

For each of the coils, FIG. 11a represents the result of comparing the strength $H_z$ of magnetic fields in the z direction at the height $D_{1s}$, which is 5 mm away from the bottom of the supporting means, and FIG. 11b represents the result of comparing the strength $H_\rho$ of magnetic fields in the ρ direction at the height $D_{2s}$, which is 8 mm away from the bottom of the support means. In this case, the height $D_{1s}$ and $D_{2s}$ are determined by considering a small device implementable as a receiver proposed by the present invention, for example, by considering the size of an in-the-ear hearing aid.

Specifically, the result of comparing the strength of magnetic field in each of the coils will be described.

Referring FIG. 11a and FIG. 11b, the first transmitting coil 1001 presents the low magnetic field strength ($H_z$, $H_\rho$) at the center, and presents the higher magnetic field strength ($H_z$, $H_\rho$) as it is farther from the center. This is due to the characteristic of the magnetic field of the helical coil forming the first transmitting coil 1001.

Conversely, in the case of the second transmitting coil 1002, the strength $H_z$ of the magnetic field in the z direction is high at the center, and the strength is sharply decreased as it is father from the center. The strength $H_\rho$ of the magnetic field in the ρ direction is low at the center and the border, and has the maximum value at a halfway point, which is about 10 mm from the center. This is due to the characteristic of the magnetic field of the spiral coil forming the second transmitting coil 1002.

The third transmitting coil 1003 and the fourth transmitting coil 1004 present the characteristic similar to that of the second transmitting coil 1002 comprising a spiral coil in the strength of a magnetic field in the z direction, and present the characteristic similar to that of the first transmitting coil 1001 comprising a helical coil in the strength of a magnetic field in the ρ direction.

Also, because the fourth transmitting coil 1004 has a coil structure identical to that of the third transmitting coil 1003, the patterns or the strengths of the magnetic fields of the two transmitting coils are similar. However, in the case of the fourth transmitting coil 1004, the number of turns of the coil, the spacing between wires, and the gradient of the helical coil may be adjusted to control the strength of the magnetic field, thus the strength of the magnetic field is increased compared to the third transmitting coil 1003.

Consequently, when a bowl-shaped transmitting coil according to an embodiment of the present invention is used, a relatively uniform magnetic field may be formed in the magnetic field area and a dead zone may be minimized, whereby one or more receivers may be effectively charged regardless of the position and arrangement of the receiving coil. Namely, free positioning of a transmitter and a receiver and charging of multiple receivers are possible.

Figure 12:
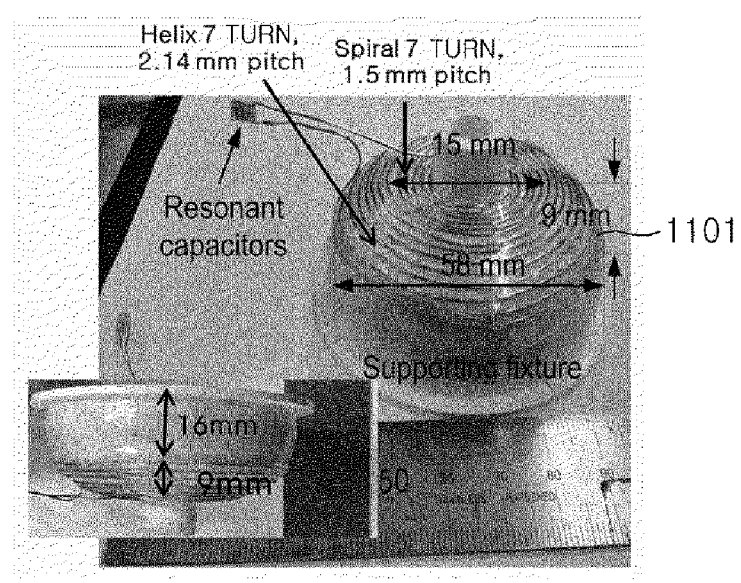
FIG. 12 is a view illustrating an example in which a 3-dimensional wireless power transmitting coil is produced according to an embodiment of the present invention.

FIG. 12 is a view illustrating an example in which a 3-dimensional wireless power transmitter coil has been produced according to an embodiment of the present invention, and the transmitter coil has been produced according to the configuration condition of the transmitter coil, which was mentioned with reference to FIGS. 10a, 10b and 10c.

As described with reference to FIGS. 10a, 10b and 10c, the transmitting coil 1101 illustrated in FIG. 12 uses a copper wire, the diameter of the wire is 0.64 mm, the total height is 9.1 mm, the spacing between the wires of a spiral coil loop on the bottom is 1.5 mm, the spacing between the wires of a helical coil loop in the side is 2.14 mm, and the spiral coil loop and the helical coil loop have seven turns. The transmitting coil 1101 is connected to a lumped constant capacitor to resonate at 6.78 MHz, the inductance of the coil L is 6.40 μH, and the resistance R is 1.039Ω. Therefore, the Q-factor of the transmitting coil at 6.78 MHz is 262.4.

Meanwhile, the transmitting coil and the transmitter described with reference to FIGS. 4 to 11 are the embodiments for convenience of the description, and the specifications (for example, the number of turns, the coil size, the bowl size, etc.) are not limited to the above description. The transmitting coil and the transmitter may be implemented in various forms and sizes. Also, as an embodiment of the present invention, a hearing aid and storage for hearing aids are described. However, without limitation to the example, the receiver and the transmitter may be implemented for various uses, for example, small devices, smart phones, and iPads, and the storage for the devices.

Meanwhile, in the transmitting coil, illustrated in FIGS. 4 to 7, and FIG. 12, the multi-loop coil unit and the conical helical coil unit are implemented as a circular form, and the transmitter is implemented to have a circular bowl shape. However, according to other embodiments of the present invention, the loops of the multi-loop coil unit and the conical helical coil unit may be implemented in various forms, for example, as a polygonal form or an elliptical form, in addition to the circular form.

Figure 13:
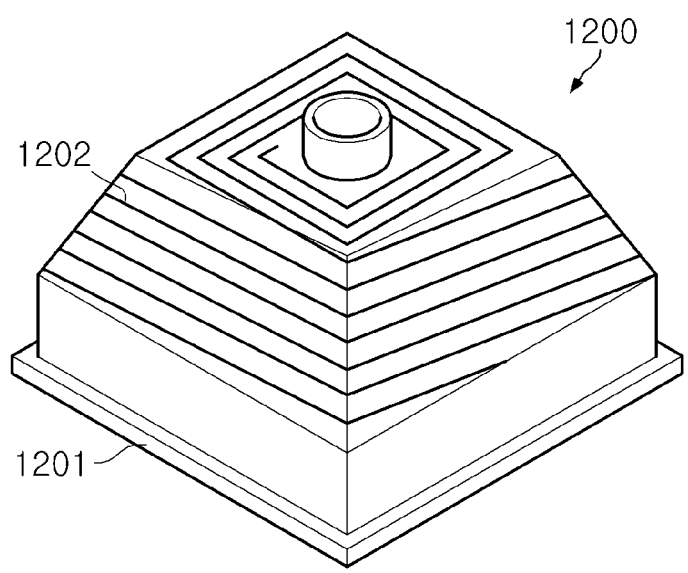
FIGS. 13 and 14 illustrate another example of the mechanical form of a bowl-shaped transmitter to which the structure of a wireless power transmitting coil according to an embodiment of the present invention is applied.
Figure 14:
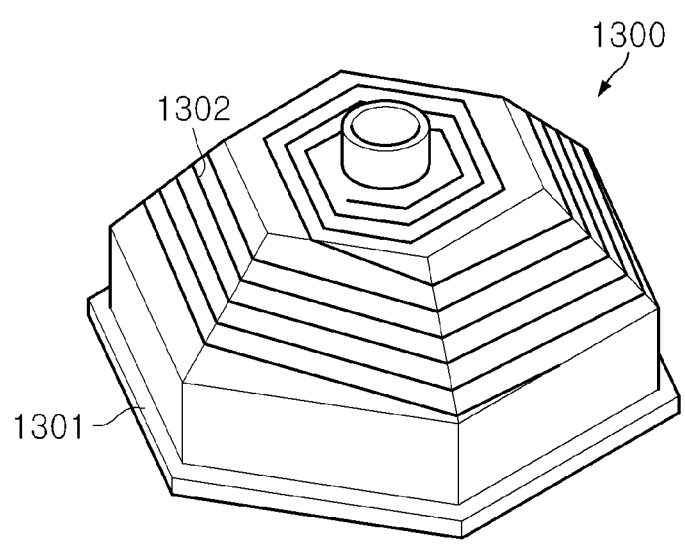

With regard to this, FIGS. 13 and 14 illustrate another example of the mechanical form of a bowl-shaped transmitter to which the structure of a wireless power transmitting coil according to an embodiment of the present invention is applied.

According to other embodiments of the present invention, the horizontal section 1201 of a transmitter 1200 may be formed as a rectangle as illustrated in FIG. 13, and the horizontal section 1301 of a transmitter 1300 may be formed as a hexagon as illustrated in FIG. 14. In the transmitter illustrated in FIGS. 13 and 14, the multi-loop coil unit 1202 or 1302 and the conical helical coil unit 1202 or 1302 may be wound in the lower part (the upper part in the drawings because the drawings illustrates the transmitter seen from the bottom) and may be wound along the outer circumference surface of the side. The horizontal section of a transmitter may be implemented in various forms including a polygonal form, an elliptical form, and the like.

Figure 15:
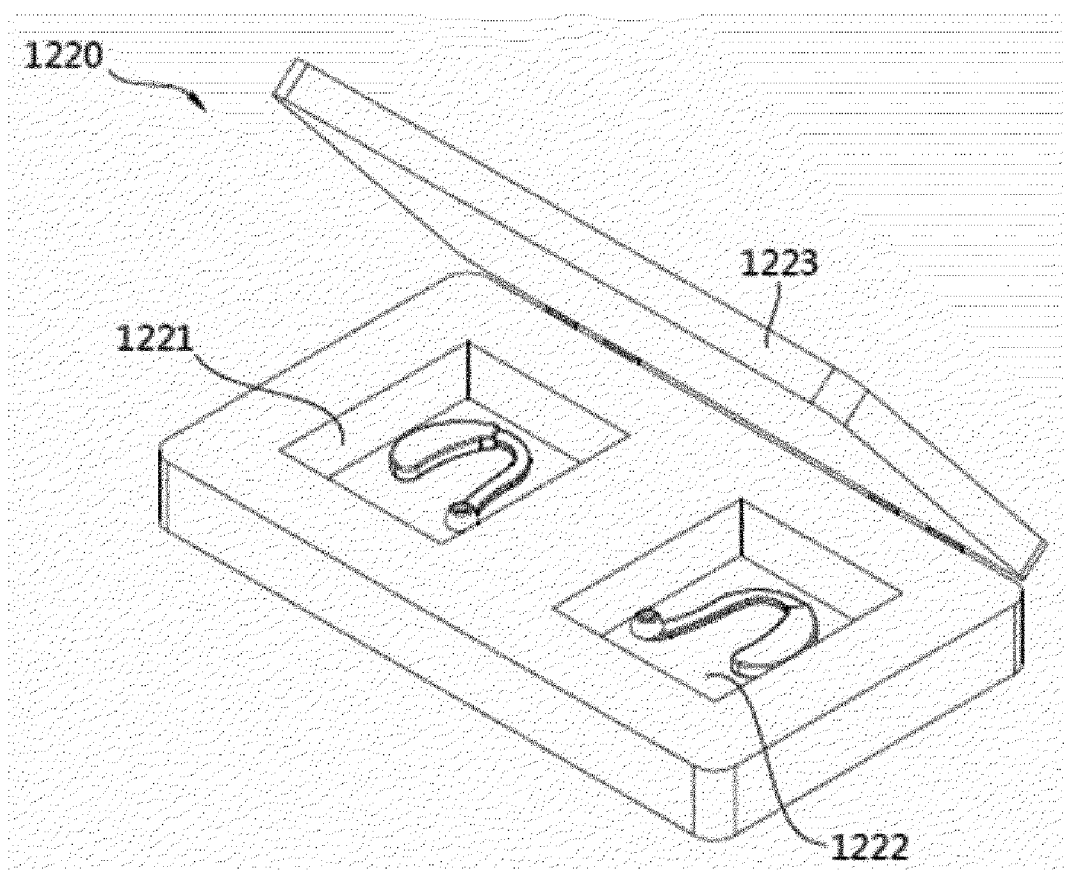
FIG. 15 is a perspective view illustrating an example in which multiple receivers and a transmitter capable of containing and storing the multiple receivers are implemented as another embodiment of the present invention.

FIG. 15 is a perspective view illustrating an example in which multiple receivers and a transmitter capable of containing and storing the multiple receivers are implemented as another embodiment of the present invention.

As illustrated in FIG. 15, another embodiment of the present invention implements a transmitter 1220 as a hearing aid case, and a hearing aid corresponding to a receiver may be stored and charged in the transmitter. Inside the transmitter 1220 are storage spaces 1221 and 1222 for respectively containing left and right hearing aids, and a cover 1223 for covering the storage spaces 1221 and 1222 is arranged for safe keeping. The above-mentioned coil structure may be installed in the interior corresponding to each of the storage spaces 1221 and 1222 of the transmitter 1220.

Figure 16:
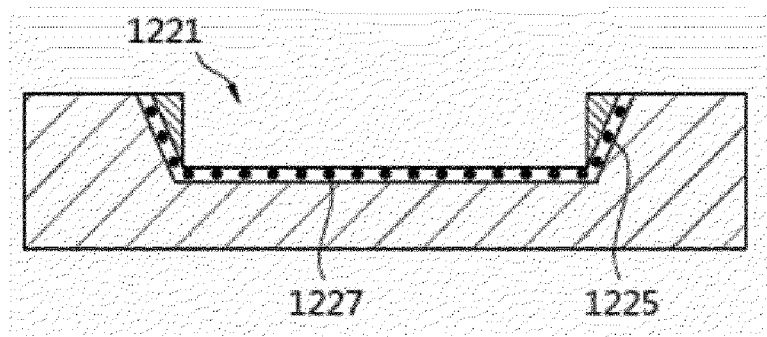
FIG. 16 illustrates the cross section of the transmitter illustrated in FIG. 15, and specifically illustrates the cross section of a left storage space.

FIG. 16 illustrates the cross section of the transmitter 1220 illustrated in FIG. 15, and specifically illustrates the cross section of the left storage space 1221.

As illustrated in FIG. 16, a multi-loop coil unit 1227 is installed in inner bottom of the left storage space 1221, and a helical coil unit 1225 is installed in the side wall of the interior. The multi-loop coil unit 1227 and the conical helical coil unit 1225 may be a rectangular plane form to correspond to the rectangular storage space 1221. Namely, the multi-loop coil unit 1227 and the conical helical coil unit 1225 may be a rectangular spiral coil and a rectangular conical helical coil, respectively.

When the hearing aid case illustrated in FIGS. 15 and 16 is implemented, it is possible to automatically charge a hearing aid while it is contained and stored in the case. In this case, the hearing aid case may be implemented to charge a battery as quick as possible through a high speed charging function, and may be implemented to charge the hearing aid many times by mounting a battery having a larger capacity compared to the battery capacity of the hearing aid.

Meanwhile, a receiving coil included in a receiver according to an embodiment of the present invention may be wound in a plate-type supporting means. Hereinafter, various embodiments of a receiving coil will be described with reference to FIGS. 17 to 19.

Figure 17A:
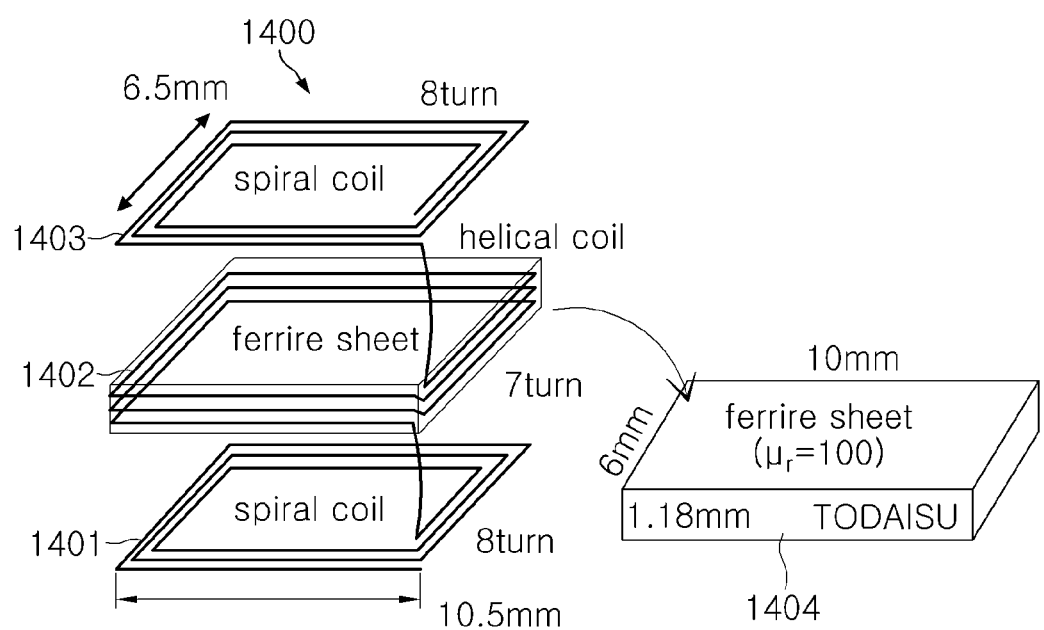
FIG. 17a and FIG. 17b are views illustrating an example of components forming a receiving coil according to an embodiment of the present invention.
Figure 17B:
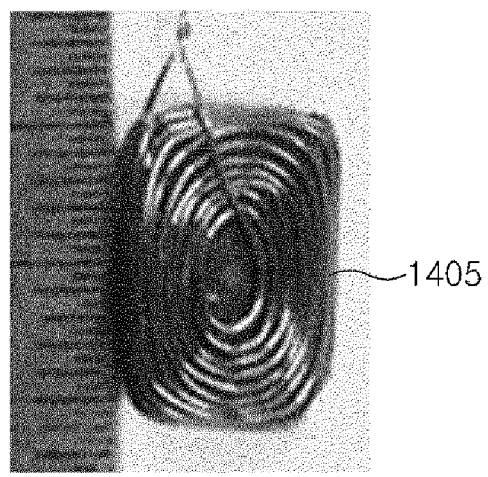

FIG. 17a and FIG. 17b are views illustrating an example of components forming a receiving coil according to an embodiment of the present invention.

The receiving coil 1400 illustrated in FIG. 17a is a coil mounted on a receiver. When a certain wide surface forming a supporting means is defined as a first plane and the opposite side of the first plane is defined as a second plane, the receiving coil 1400 may comprise a first horizontal coil unit 1401, which is wound horizontally to be aligned with the first plane of the supporting means, a vertical coil unit 1402, which is vertically wound along the side wall of the supporting means, and a second horizontal coil unit 1403, which is wound horizontally to be aligned with the second plane. In this case, the first horizontal coil unit 1401 and the second horizontal coil unit 1403 use a spiral coil, and the vertical coil unit 1402 uses a helical coil.

The multi-loop coil unit and the helical coil unit use a single wire to use a frequency higher than several MHz, and may be implemented as a structure having multiple turns. For example, the size of the whole receiving coil is designed as a rectangular parallelepiped of which the width, the length, and the height are respectively 10.5 mm, 6.5 mm, and 2.46 mm; the spiral coil forming the first horizontal coil unit 1401 and the second horizontal coil unit 1403 is implemented to have eight turns; the helical coil forming the vertical coil unit 1402 is implemented to have seven turns; and the coils may be connected to each other in series. Also, desirably, when the coil structure is implemented using multiple turns in each of the coil unit, it is possible to make the spacing between each turn of the coil be identical for the lowest resistance.

Also, inside the receiving coil, a structure having a sheet of magnetic characteristic, suitable for the shape of the receiving coil, may be used for focusing of magnetic flux. For example, as illustrated in FIG. 17a, a supporting means 1404 having a ferrite rectangular parallelepiped shape may be implemented by forming a rectangular plate-type structure by stacking multiple ferrite sheets of which the magnetic permeability is 100.

FIG. 17b illustrates an example of a receiving coil produced according to the configuration illustrated in FIG. 17a. The produced receiving coil 1405 has been produced according to the coil specification mentioned in FIG. 17a. Specifically, it has a rectangular parallelepiped structure of which the width, the length, and the height are respectively 10.5 mm, 6.5 mm, and 2.46 mm; the spiral coil has eight turns; the helical coil has seven turns; the coils are connected to each other in series; and a copper wire of which the diameter is 0.25 mm is used. Also, a lumped constant capacitor is connected in order that the receiving coil 1405 resonates at 6.78 MHz. The inductance and the resistance of the produced receiver resonant coil 1405 are 3.09 µH and 3.400Ω, respectively. Therefore, the Q-factor of the receiving coil at 6.78 MHz is 38.7.

Meanwhile, a receiving coil according to an embodiment of the present invention may be implemented in various forms, besides the rectangular form illustrated in FIG. 15.

Figure 18:
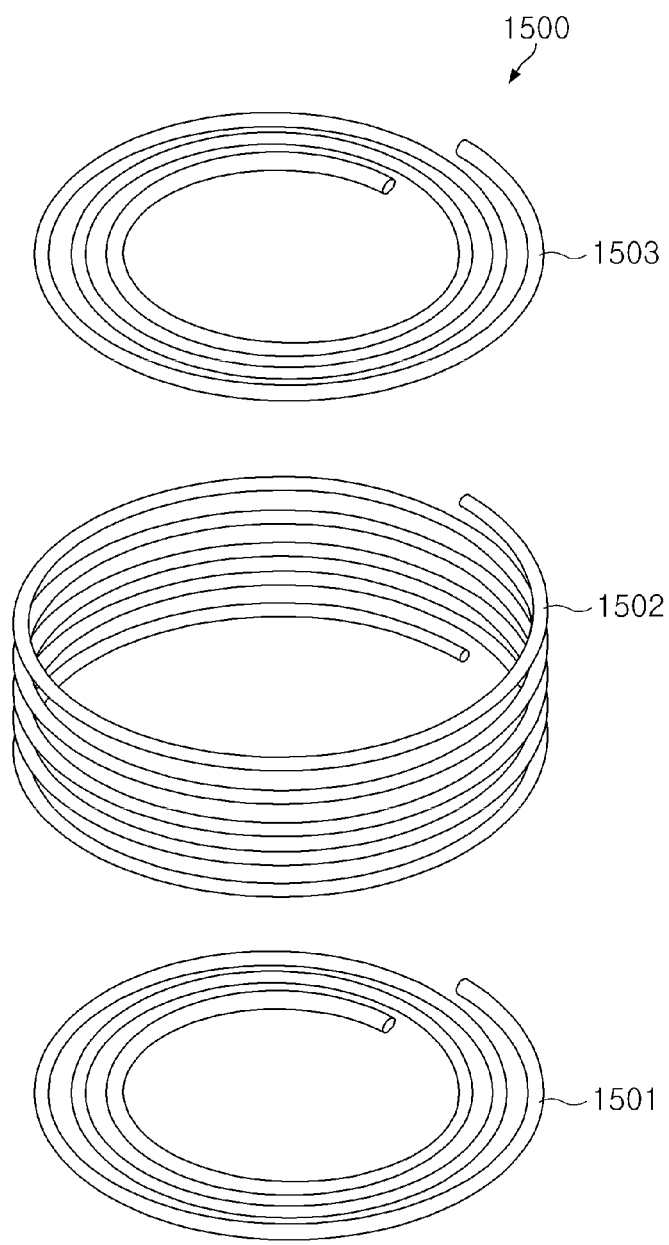
FIGS. 18 and 19 are views illustrating various other embodiments of a receiving coil according to an embodiment of the present invention.
Figure 19:
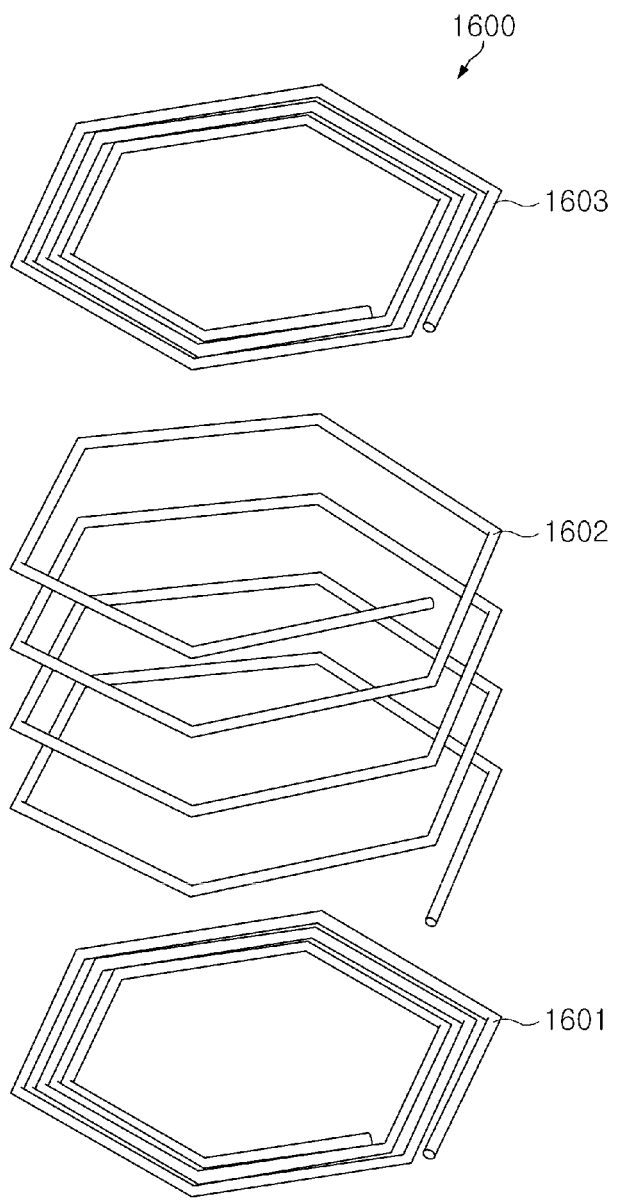

FIGS. 18 and 19 are views illustrating various other embodiments of a receiving coil according to an embodiment of the present invention.

Referring to FIGS. 18 and 19, a receiving coil 1500 having a circular form and a receiving coil 1600 having a hexagonal form are illustrated.

As illustrated in FIGS. 18 and 19, the receiving coil 1500 or 1600 may be formed by stacking a first multi-loop coil unit 1501 or 1601, a helical coil unit 1502 or 1602, and a second multi-loop coil unit 1503 or 1603, each of the units having a circular form or a hexagonal form according to the form of the receiving coil.

Also, although not illustrated in FIGS. 18 and 19, a circular or hexagonal plate-type supporting means, for example, a ferrite sheet unit may be further included to support the receiving coil.

The proposed receiving coil structure may be applied to the proposed transmitting coil structure, but may be used in a transmitting coil structure having another form. For example, it may be applied to a flat plate-type spiral structure, a box-type coil structure, and the like.

Figure 20A:
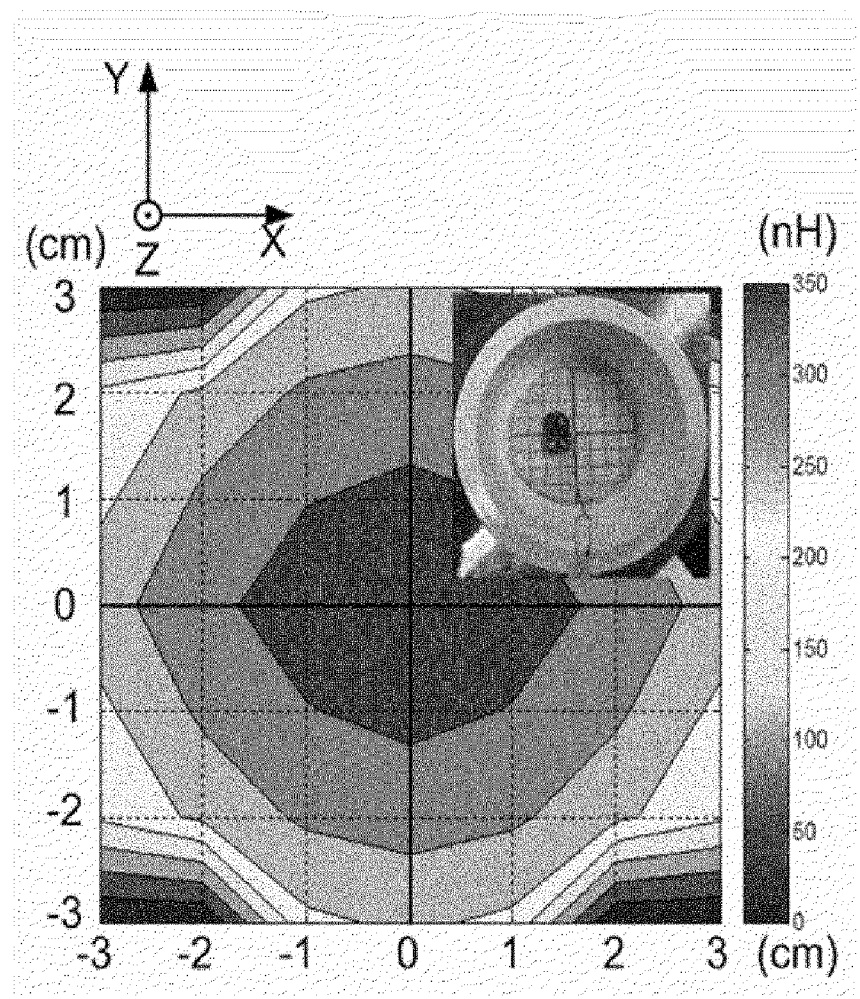
FIG. 20a and FIG. 20b are views illustrating an example of a result of measuring mutual inductance between a transmitting coil and a receiving coil according to an embodiment of the present invention.
Figure 20B:
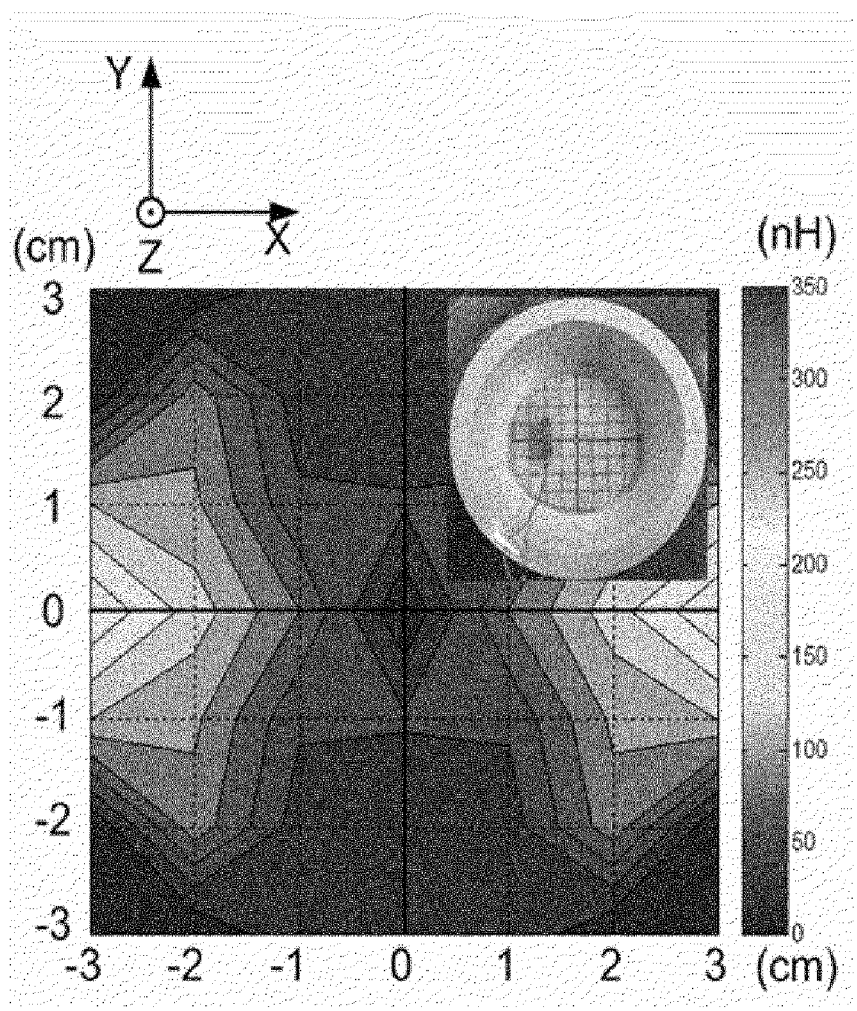

FIG. 20*a* and FIG. 20*b* are views illustrating an example of a result of measuring mutual inductance between a transmitting coil and a receiving coil according to an embodiment of the present invention. Specifically, the result of measuring the mutual inductance between the transmitting coil and the receiving coil, which varies according to the receiving coil array, is illustrated.

FIG. 20*a* is the result of measuring the mutual inductance when a receiving coil is arranged in parallel with a transmitting coil, and FIG. 20*b* is a result of measuring the mutual inductance when the receiving coil is arranged to be perpendicular to the transmitting coil. In this case, the used transmitting coil and the used receiving coil are the transmitting coil and the receiving coil according to the embodiment described above with reference to FIG. 12, FIG. 17*a* and FIG. 17*b*, and the locations of the coils are determined to be identical to the receiving coil arrangement used in the simulation illustrated in FIGS. 10*a*, 10*b* and 10*c*. Namely, the receiving coil is implemented to be placed 5 mm away from the bottom of a supporting means in the parallel arrangement, and the receiving coil is implemented to be placed 8 mm away from the bottom of the supporting means in the perpendicular arrangement.

As illustrated in FIG. 20*a*, the mutual inductance between the transmitting coil and the receiving coil in the parallel arrangement is about 350 nH at the center, and decreases as it is closer to the border. As illustrated in FIG. 20*b*, the mutual inductance between the transmitting coil and the receiving coil in the perpendicular arrangement is about 2.25 nH at the center, increases as it is closer to the border, and has the maximum value, 178.5 nH. Also, when the receiving coil moves along the x-axis in the perpendicular arrangement, the mutual inductance increases. However, when the receiving coil moves along the y-axis, neither the z-direction magnetic field nor the ρ-direction magnetic field is interlinked with the receiving coil, thus the mutual inductance may become about zero.

Meanwhile, through the resistance and the mutual inductance of the transmitting the receiving coils, the theoretical maximum efficiency $\eta^{max}$ of a wireless power transceiver system may be calculated by the following equation 8.

$$\eta^{max} = \frac{\frac{\omega^2 M^2}{R_1 R_2}}{\left[1 + \sqrt{1 + \frac{\omega^2 M^2}{R_1 R_2}}\right]^2} \qquad \text{[Equation 8]}$$

$\omega$ is an angular frequency, M is mutual inductance between receiving and transmitting coils, $R_1$ and $R_2$ are the resistances of the transmitting and receiving coils, respectively. Referring to equation 8, the maximum efficiency $\eta^{max}$ of the wireless power transceiver system is a maximum of 80.11% at the center of the transmitting coil when the transmitting coil and the receiving coil are arranged to be parallel with each other, and is a maximum of 61.3% at the point where ρ=3 cm when the transmitting coil and the receiving coil are arranged to be perpendicular to each other. This is the theoretical maximum efficiency of a transmitter/receiver resonant coil, and suitable impedance matching may be required to obtain this maximum efficiency.

Meanwhile, in the above-described embodiments, an example in which the coil structure illustrated in FIGS. 4 and 5 is implemented for a transmitting coil and the coil structure illustrated in FIGS. 17*a* and 17*b* is implemented for a receiving coil is explained. However, according to another embodiment of the present invention, the coil structure illustrated in FIGS. 4 and 5 may be implemented for a receiving coil, and the coil structure illustrated in FIGS. 17*a* and 17*b* may be implemented for a transmitting coil. For example, according to another embodiment, at least a part of a receiver is formed to have a bowl shape and a receiving coil is implemented to include a multi-loop coil unit and a helical coil unit. Namely, the improved coil structure proposed according to the present invention, for example, the coil structure having a multi-loop coil unit and a conical helical coil unit, may be applied to at least one of the transmitting coil and the receiving coil.

Figure 21:
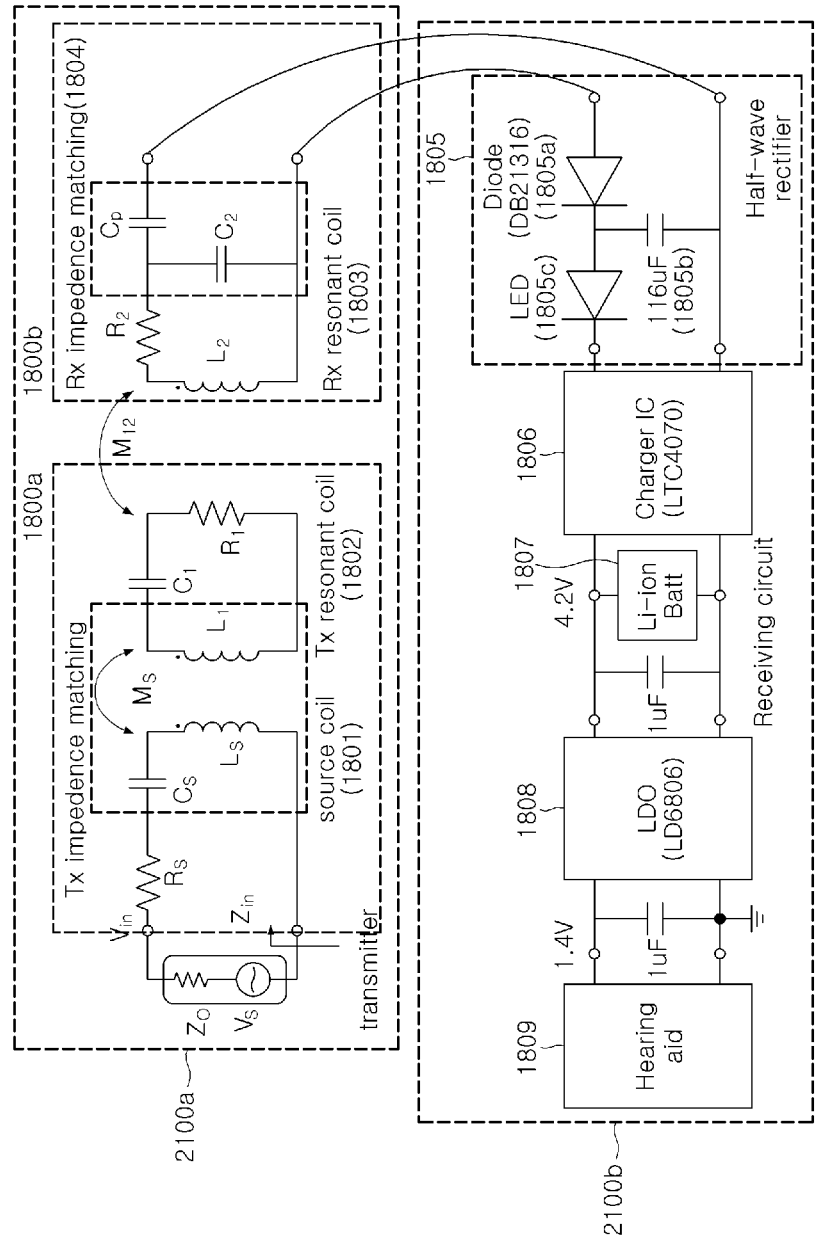
FIG. 21 illustrates another example of the circuit configuration of a wireless power transceiver system according to an embodiment of the present invention.

FIG. 21 is a view illustrating another example of the circuit configuration of a wireless power transceiver system according to an embodiment of the present invention, and specifically shows a circuit diagram for performing impedance matching to maximize the efficiency of the wireless power transceiver system.

Referring to FIG. 21, the wireless power transceiver system according to another embodiment of the present invention comprises a transmitter 1800*a* and a receiver 1800*b*.

The transmitter 1800*a* comprises a source coil 1801 for Tx impedance matching and a transmitter resonant coil 1802. The source coil of inductance $L_S$ and loss resistance $R_S$ 1801 is connected with an AC source of characteristic impedance $Z_0$. Lumped capacitor $C_S$ is connected to the source coil. In this case, the capacitor $C_S$ may not be used according to the circuit condition.

The transmitter resonant coil 1802 comprises the transmitter resonant coil of inductance $L_1$, capacitor $C_1$ connected to the transmitter resonant coil, and loss resistor $R_1$. The source coil 1801 and the transmitter resonant coil 1802 may perform transmitter input impedance matching by controlling mutual impedance $M_S$. However, without limitation to the illustrated matching circuit, various matching circuits may be used. For example, a transmitter resonant coil unit may be directly connected to capacitors rather than using a source coil. In this case, the capacitors may be configured in series, parallel, series-parallel, or parallel-series with the AC source.

When the source coil illustrated in FIG. 21 is produced, the source coil may be a spiral coil of which the radius is 11 mm and the spacing between wires is 2 mm, and the spiral coil may have two turns. Also, the source coil may be located on the bottom surface of the transmitting coil. For example, the source coil may be placed in the lower part of the transmitting coil by being wound using the second groove $H_2$ arranged in the inner part underneath the bottom surface of the transmitter as illustrated in FIG. 6. The exemplary inductance of the source coil is 150 nH, $M_S$=364 nH.

Meanwhile, the receiving end of the receiver 1800b comprises a receiver resonant coil 1803 and a receiver impedance matching circuit 1804. The receiver resonant coil 1803 has the inductance $L_2$ and the loss resistance $R_2$.

The receiver impedance matching circuit 1804 uses capacitors $C_2$ and $C_p$ for Rx impedance matching, and the receiver resonant coil 1803 may be connected to the capacitors $C_2$ and $C_p$ of the receiver impedance matching circuit 1804 in series and in parallel as shown in the drawing. If the connections are in series and parallel as mentioned above, when multiple devices are charged, more power is supplied to a load of lower impedance.

In this case, although not illustrated in FIG. 21, mutual impedance may be present between the source coil 1801 and the receiver resonant coil 1803, and when the mutual impedance does not largely affect the system performance, it may be ignored. However, when the source coil 1801 is very close to the receiver resonant coil 1803, or when multiple receivers are simultaneously charged, it is necessary to consider the exact impedance matching.

The receiving end of the receiver 1800b, namely, the receiver resonant coil 1803 and the capacitors $C_2$ and $C_p$ of the receiver impedance matching circuit 1804 are connected with a receiving signal processing circuit, the circuit comprising a rectifier circuit 1805, a charger circuit 1806, which is LTC4070, a Li-ion battery 1807, a DC-DC converter circuit 1808, and a load 1809. Here, the DC-DC converter circuit 1808 uses LD6806, which is an LDO circuit, and the load 1809 may be a hearing aid. Because current, transmitted to charge the Li-ion battery 1807 of the load, is limited to 20 mA to prevent battery overcurrent, the load impedance has an impedance value of hundreds ohm, and this impedance value is high compared to an existing smart phone's battery that is charged with high current. Therefore, the implementation of the parallel resonance circuit is intended to prevent a decrease in the efficiency of a wireless charging system, which may be caused when the series resonant circuit is used.

Consequently, it is desirable that the receiver impedance matching circuit 1804 applies a parallel resonance circuit in which a receiver resonant coil, a capacitor, and a load are connected with each other in parallel, for example, in the case of the capacitor $C_2$ connected in parallel to the receiving coil 1803, $C_2 \neq 0$, and in the case of the capacitor $C_p$ connected in series, $C_p=0$.

However, without being limited to the parallel resonance circuit as illustrated in FIG. 21, it is possible to implement a matching circuit using any one of series-parallel, parallel, and series capacitors according to an implementation method. Also, like the transmitter 1800a, matching may be performed by arranging a load coil connected to the receiver resonant coil and the rectifier circuit.

The receiving signal processing circuit of the receiver 1800b may include a receiving circuit comprising a half-wave rectifier circuit 1805 for converting the voltage induced in the receiver resonant coil 1803 into direct current, a red LED 1805c for detection, a battery charger IC 1806 for charging a Li-ion battery, and the Li-ion battery 1807.

The Li-ion battery 1807 has voltage of 4.2 V in a normal state, but a hearing aid corresponding to the load 1809 operates at voltage of 1.4 V. Therefore, in order to use the battery voltage for the hearing aid, the voltage may be dropped using a Linear Drop Out. For example, the LDO 1808 used in the receiving circuit is LD6806 of NXP Semiconductors, and the measured value of the applied voltage of the hearing aid may be 1.417 V.

To reduce the size of the reception signal processing circuit, the rectifier circuit 1805 is configured as a half-wave rectifier circuit, which only uses a single diode 1805a, rather than a full-wave rectifier circuit. In this case, the diode 1805a is, for example, DB27316 of Panasonic Corporation, the threshold voltage thereof is 0.55 V, and the diode may be implemented as a low-current rectifying diode. A smooth capacitor 1805b, connected in parallel to the diode 1805b to smooth the rectified voltage, may minimize ripple voltage by being connected in parallel to a general RF capacitor to have 116 μF.

Also, the red LED 1805c for detecting the charge is connected to show the charging state. In the state of charge, the voltage difference between the output voltage of the rectifier circuit 1805 and the input voltage of the charger IC 1806 may be fixed to the threshold voltage of the LED 1805c. For example, for low current charging of the Li-ion battery 1807, the charger IC 1806 may use LTC4070 of Linear Technology Corporation. In this case, the IC 1806 may have operating current from minimum 450 nA to maximum 50 mA for charging.

As described above, a wireless power transceiver system including the circuit illustrated in FIG. 21 may be implemented as a wireless charging system for a small hearing aid.

Figure 22:
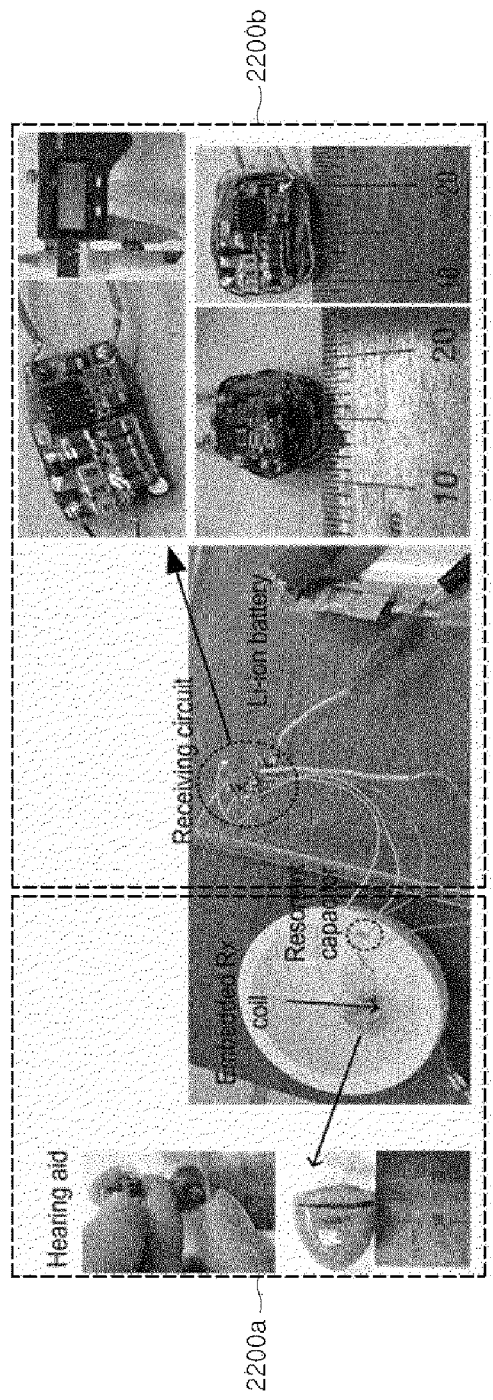
FIG. 22 is a view illustrating an example of the shape of a wireless charging system for a small hearing aid, based on the circuit configuration of a wireless power transceiver system according to an embodiment of the present invention.

FIG. 22 is a view illustrating an example of the shape of a wireless charging system for a small hearing aid, based on the circuit configuration of a wireless power transceiver system according to an embodiment of the present invention.

FIG. 22 illustrates the shape of a wireless charging system for a small hearing aid 2200a, which is produced by reflecting the transmitter circuit diagram 2100a mentioned above in the description of FIG. 21, and the shape of a receiving coil and a receiving circuit 2200b, which are produced by reflecting the circuit diagram of the receiver 2100b that is produced to be connected to the receiver resonant coil mentioned in the description of FIG. 21.

Referring to FIG. 22, the hearing aid corresponding to a receiver is an in-the-ear hearing aid of Dae-Han hearing aids corporation, and the length and width thereof are 18 mm and 15 mm, respectively. A Li-ion battery is a pouch-type battery, and the width, length, and height of a cell are 10 mm, 10 mm, and 4.09 mm, respectively. FIG. 22 also shows the shape of the produced receiving coil and receiving circuit, the height of the combination of the receiving coil and the receiving circuit is 4 mm. The receiving circuit is produced on a PCB board of 0.4 mm FR4, and the size thereof is suitable for being embedded in the hearing aid, along with the receiving coil.

A wireless power transceiver system including the circuit configuration illustrated in FIGS. 21 and 22 is used for charging of a small Li-ion battery, which was developed for operating a small hearing aid, but may be applied to various wearable medical devices and various portable information communication devices such as wearable information communication devices, smart phones, etc.

Figure 23:
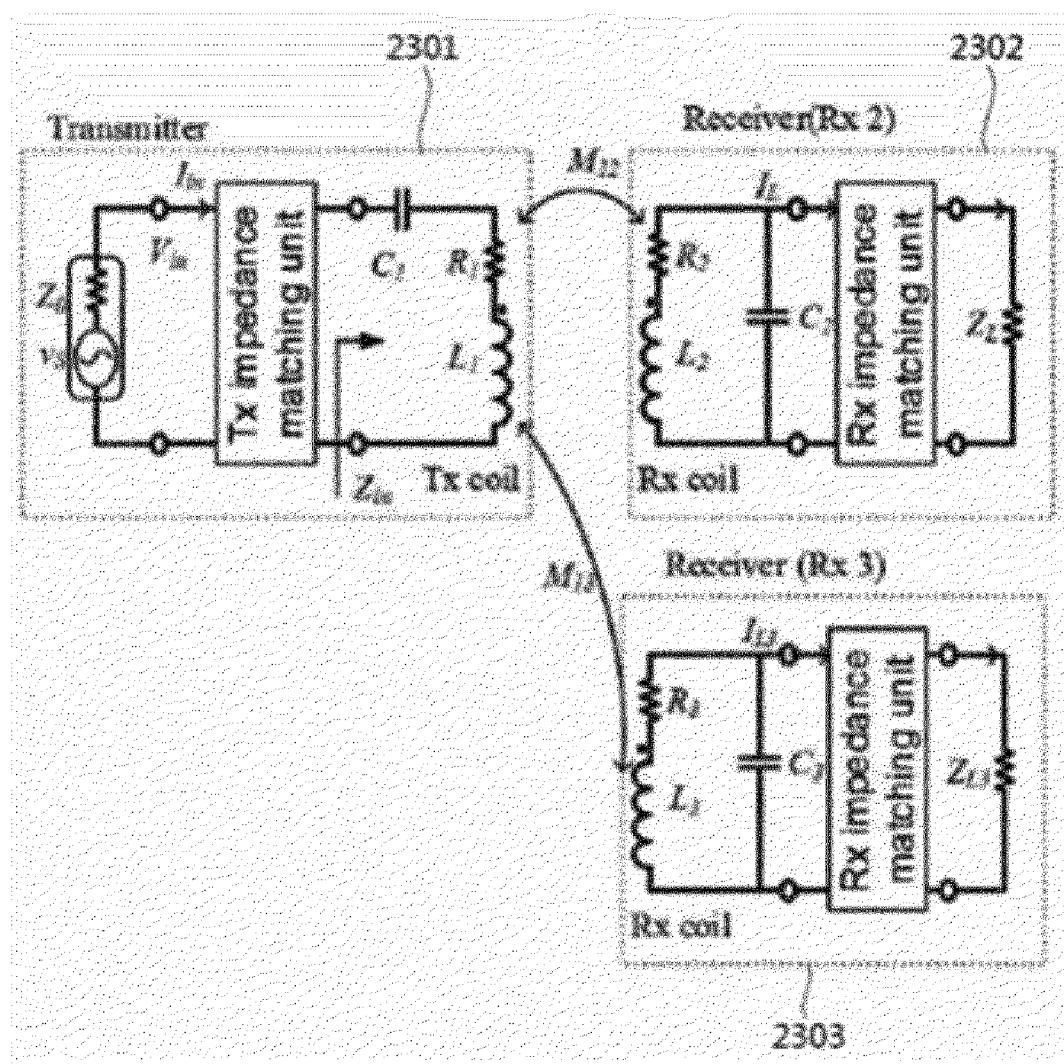
FIG. 23 illustrates another example of the circuit configuration of a wireless power transceiver system according to an embodiment of the present invention.

FIG. 23 is a view illustrating another example of the circuit configuration of a wireless power transceiver system according to an embodiment of the present invention. Specifically, FIG. 23 shows a circuit diagram representing an equivalent circuit corresponding to an example in which power is transmitted from a transmitter to multiple receivers, for example, to a first receiver and a second receiver.

As illustrated in FIG. 23, a transmitter 2301 may transmit wireless power based on magnetic coupling, depending on mutual inductance $M_{12}$ and $M_{13}$ with a first receiver 2302 and a second receiver 2303, respectively. The transmitting coil of the transmitter 2301 illustrated in FIG. 23 may have a coil structure proposed by the present invention, illustrated in FIGS. 4 and 5. For example, mechanically, the example illustrated in FIG. 23 may be a state in which multiple receivers are placed in the bowl-shaped transmitter 2301. For example, the parameters of the transmitter 2301 illustrated in FIG. 23 may use the parameters of the transmitter in the description of FIG. 21, and the parameters of the first receiver 2302 or the second receiver 2303 may use the parameters of the receiver in the description of FIG. 21.

Although not illustrated in FIG. 23, the output of the transmitter is an AC source signal $V_S$. The transmitter 2301 includes a self-inductance $L_1$, a resistor $R_1$, and a capacitor $C_1$ for resonance. The first receiver 2302 includes a self-inductance $L_2$, a resistor $R_2$, and a capacitor $C_2$ for resonance. Also, the second receiver 2303 may include a self-inductance $L_3$, a resistor $R_3$, and a capacitor $C_3$ for resonance.

The circuit diagram illustrated in FIG. 23 shows a series circuit in which the capacitor $C_1$ of the transmitter 2301 is connected to the inductance $L_1$ and the resistor $R_1$ in series, but the circuit is not limited to this example. According to another embodiment, the capacitor $C_1$ of the transmitter 2301 may be connected to the inductance $L_1$ and the resistor $R_1$ in parallel. Also, FIG. 21 illustrates a series circuit in which the capacitor $C_2$ of the receiver 2302 is connected to the inductance $L_2$ and the resistor $R_2$ in parallel, but the circuit is not limited to this example. According to another embodiment, the capacitor $C_2$ may be connected to the inductance $L_2$ and the resistor $R_2$ in series. Similarly, FIG. 23 shows a series circuit in which the capacitor $C_3$ of the receiver 2303 is connected to the inductance $L_3$ and the resistor $R_3$ in parallel, but the circuit is not limited to this example. According to another embodiment, the capacitor $C_3$ may be connected to the inductance $L_3$ and the resistor $R_3$ in series.

Desirably, to enable the transmitting coil to transmit maximum power to the first receiving coil and the second receiving coil through magnetic coupling, the transmitter 2301 may include an impedance matching unit for impedance matching with the first receiver 2302, for example, a Tx impedance matching unit, and the second receiver 2302 may include an Rx impedance matching unit for impedance matching between load impedance ($Z_L$) and the impedance looking into the Rx coil of the first receiver. Similarly, the second receiver 2303 may include an Rx impedance matching unit for impedance matching between load impedance ($Z_{L3}$) and the impedance looking into the Rx coil of the second receiver.

For maximum power transmission, the transmitter impedance matching unit servers to achieve make no reactance of impedance looking into the Tx coil from the impedance matching unit, that is, imaginary of the impedance looking into the Tx coil from the impedance matching unit zero. The impedance matching unit of the first receiver 2302 and the impedance matching unit of the second receiver 2303 satisfy the condition for conjugate matching. In this case, the impedance $Z_{L2}$ or the impedance $Z_{L3}$ may mean a load such as a rectifier circuit, a DC-DC converter, a battery, a resistor, an electrical device, and the like.

Meanwhile, in the above-described coil structure according to an embodiment of the present invention, for example, in the coil structure illustrated in FIGS. 4 and 5, the multi-loop coil unit and the conical helical coil unit are configured with a single wire. Namely, the above-described transmitting coil unit is implemented with a single wire. However, in a coil structure according to another embodiment of the present invention, the multi-loop coil unit and the conical helical coil unit are respectively configured to have different wires. Namely, the transmitting coil unit is formed with multiple wires. Hereinafter, the coil structure according to this embodiment will be described.

Figure 24:
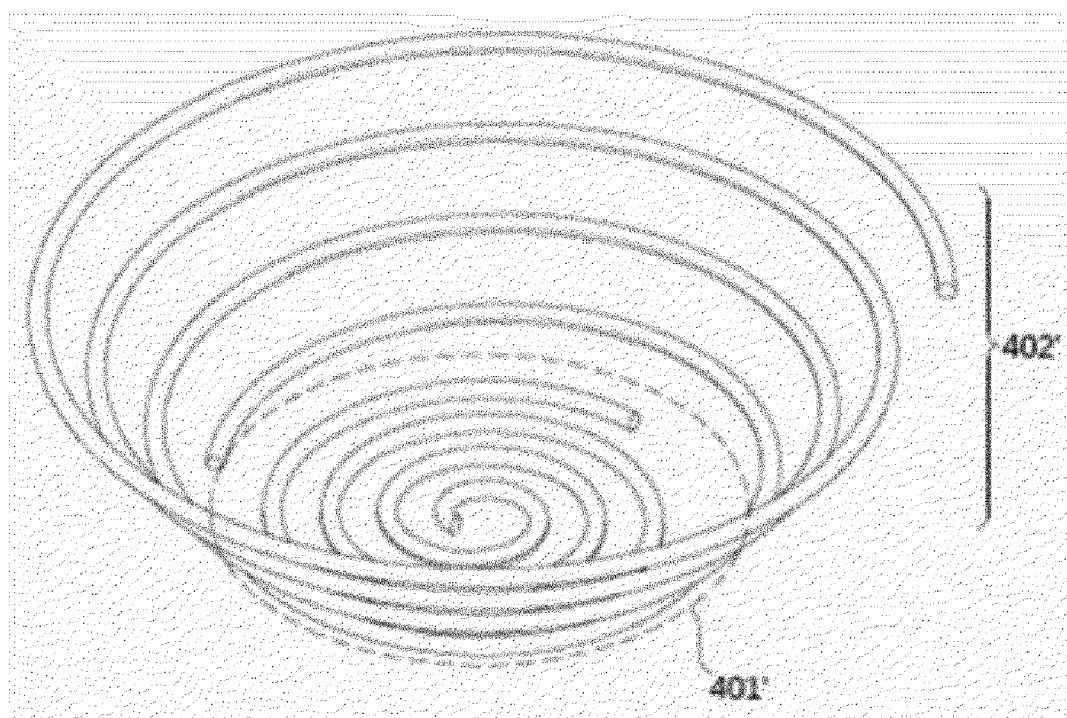
FIG. 24 is a perspective view illustrating an example of a 3-dimensional wireless power transmitting coil structure according to another embodiment of the present invention.

FIG. 24 is a perspective view illustrating an example of a 3-dimensional wireless power transmitting coil structure according to another embodiment of the present invention.

The transmitting coil according to another embodiment of the present invention, illustrated in FIG. 24, may include a multi-loop coil unit 401' formed as a circular spiral coil on a 2-dimensional plane, for example, on the floor, and a helical coil unit 402' having a conical-like form, in which a coil is wound to the vertical direction from the plane on which the multi-loop coil unit is formed but the radius of the coil loop steadily increases.

In this case, the multi-loop coil unit 401' and the conical helical coil unit 402', which form the transmitting coil 400, are implemented with physically separate wires. Namely, unlike the transmitting coil unit using a single wire, illustrated in FIG. 4, the transmitting coil unit illustrated in FIG. 24 has a structure in which the multi-loop coil unit 401' and the conical helical coil unit 402' are physically separated.

As mentioned above, the multi-loop coil unit 401' and the conical helical coil unit 402' may be implemented in various forms including a polygonal form, an elliptical form, and the like, besides a circular form illustrated in FIG. 22.

When this wireless power transmitting coil structure is used, it is possible to implement an effective transmitter based on active control according to a situation by respectively connecting AC sources to the multi-loop coil unit 401' and the conical helical coil unit 402'.

Figure 25:
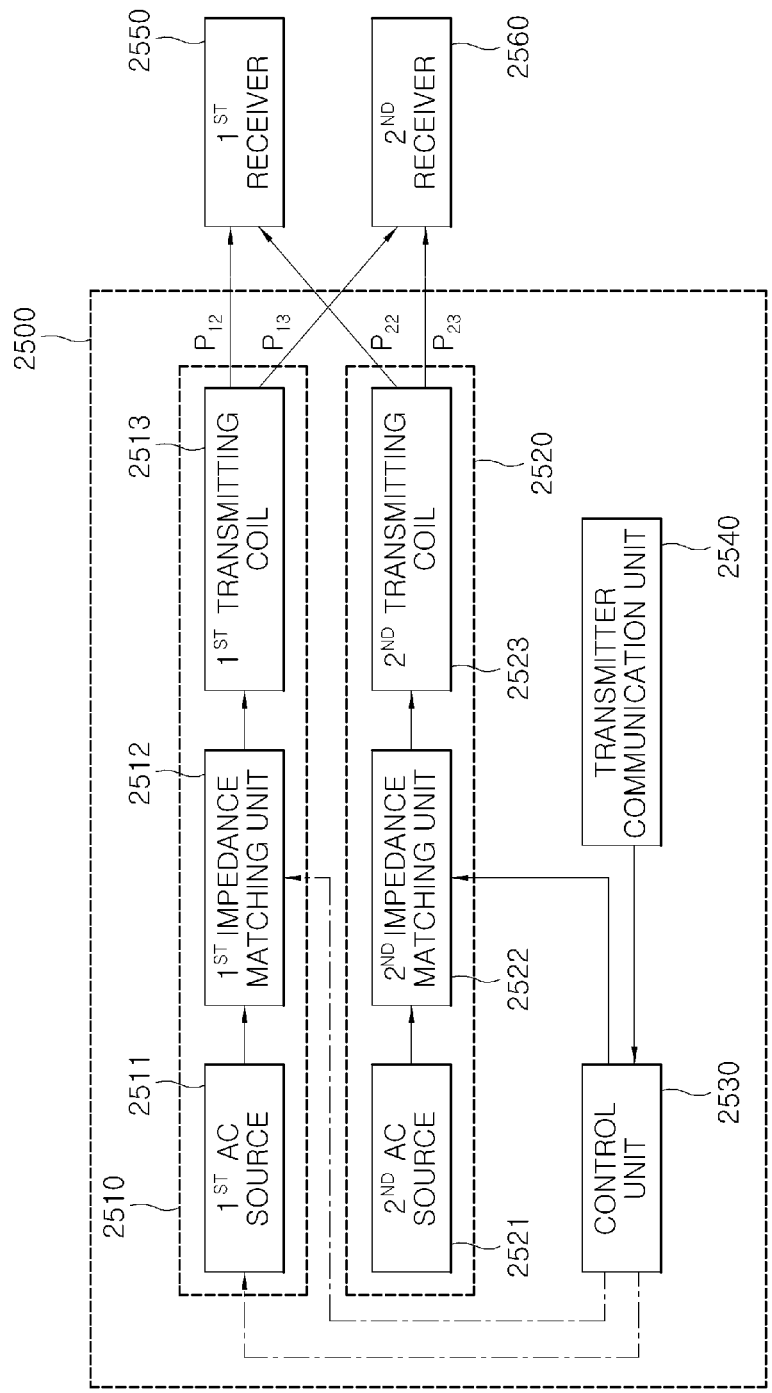
FIG. 25 is a block diagram illustrating the configuration of a wireless power transmission system according to another embodiment of the present invention.

FIG. 25 is a block diagram illustrating the configuration of a wireless power transmission system according to another embodiment of the present invention.

As illustrated in FIG. 25, a transmitter 2500 may include a first transmitter unit 2510, a second transmitter unit 2520, a control unit 2530, and a transmitter communication unit 2540. The first transmitter unit 2510 may include a first transmitting coil 2513, a first impedance matching unit 2512, and a first AC source 2511. Here, the first transmitting coil 2513 may be a multi-loop coil unit 401' illustrated in FIG. 24. The second transmitter unit 2520 may include a second transmitting coil 2523, a second impedance matching unit 2522, and a second AC source 2521. Here, the second transmitting coil 2523 may be a conical helical coil unit 402' illustrated in FIG. 24. Namely, the multi-loop coil unit 401' corresponding to the first transmitting coil 2513 and the helical coil unit 402' corresponding to the second transmitting coil 2523 are physically separated from each other, and are supplied with power from the first AC source 2511 and the second AC source 2521, respectively.

The transmitter communication unit 2540 enables the transmitter 2500 to send and receive data with at least one of the receivers 2550 and 2560 by communicating with at least one of the receivers 2550 and 2560. The communication between the transmitter 2500 and the receiver 2550 or 2560 may use In-Band communication that may transmit and receive data using wireless power transmission signals, or may use other communication methods that use a frequency different from a wireless power transmission frequency.

The control unit 2530 may obtain sensing data of wireless power through the transmitter communication unit 2540, the sensing data being transmitted from the receiver 2550 or 2560 to the transmitter 2540. Based on the obtained sensing data, the control unit 2530 controls the output power and the operation of the first AC source 2511 and the second AC source 2521, and may control the first impedance matching unit 2512 and the second impedance matching unit 2522. In other words, the signal of the first AC source 2511 and the signal of the second AC source 2521 have the same phase, but the output power may be different according to the control of the control unit 2530. As a result, the strength of a magnetic field generated in the first transmitting coil 2513 may be different from that generated in the second transmitting coil 2523.

More specifically, the control unit 2530 applies predetermined constant power to the first transmitting coil 2513 and the second transmitting coil 2523 by respectively controlling the first AC source 2511 and the second AC source 2521. Accordingly, power is wirelessly transmitted to the receiver 2500. The receiver 2550 or 2560 may transmit sensing data to the transmitter by sensing the strength of the received power. The control unit 2530 may control power of the first AC source 2511 and the second AC source 2521 based on the sensing data received from the receiver 2550 or 2560. For example, the control unit 2530 detects a transmitter unit that may transmit more power to the receiver 2550 or 2560, and may control a relevant AC source to allow the detected transmitter unit to transmit more power.

As an example, if the receiver 2550 or 2560 receives more power from the multi-loop coil unit 401', which is 2510, compared to power from the helical coil unit 402', which is 2520, the control unit 2530 may control the first AC source 2511 and the second AC source 2521 to make the multi-loop coil unit 401' supply more power than the helical coil unit 402'. As another example, if the receiver 2550 or 2560 receives most power from the helical coil unit 402', which is 2520, and hardly receives any power from the multi-loop coil unit 401' (or 2510), the control unit 2530 may control the first AC source 2511 and the second AC source 2521 to supply power only to the conical helical coil unit 402' and not to supply power to the multi-loop coil unit 401'.

As mentioned above, according to the position or the state of the receiver 2550 or 2560 in the wireless power transmission area, the control unit 2530 may supply more power to the transmitter unit from which the receiver 2550 or 2560 receives more power, or may reduce the supply of power to the transmitter unit that hardly transmits power. Therefore, according to this embodiment, the wireless power transmission efficiency is largely increased, and effective wireless power transmission is possible.

Meanwhile, when there are multiple receivers (for example, when 2550 and 2560 exist), the control unit 2530 applies predetermined constant power to the first transmitting coil 2513 and the second transmitting coil 2523 by respectively controlling the first AC source 2511 and the second AC source 2521. Then, the control unit may control the strength of magnetic fields generated in the first transmitting coil 2513 and the second transmitting coil 2523 by controlling the output of the first AC source 2511 and the second AC source 2521 based on the sensing data about power, and the data being received from the receivers 2550 and 2560.

Meanwhile, the control unit 2530 may control the first impedance matching unit 2512 and the second impedance matching unit 2522, which are respectively arranged in the first transmitter unit 2510 and the second transmitter unit 2520. For such control, the receiver 2550 or 2560 senses at least one of voltage and current, measured at a node before the rectifier circuit or measured at a node after the rectifier circuit, and transmits the data to the transmitter 2500. Based on the received sensing data, the control unit 2530 controls the first impedance matching unit 2512 and the second impedance matching unit 2522 for optimal transmitter impedance matching. Meanwhile, as described above for the embodiments of the present invention, a single metal wire or multiple metal wires may be used to design a coil in a frequency band greater than several MHz. However, if the number of turns of the wire in the coil unit is increased to enhance the strength of a magnetic field during wireless power transmission, the skin effect of the wire increases as the frequency is higher. Also, the proximity effect between adjacent wires rapidly increases as the number of turns of the wire forming the coil is increased, thus causing an increase in loss resistance.

The present invention proposes a coil structure capable of maximizing the strength of a magnetic field by minimizing loss resistance by considering a proximity effect between wires and a skin effect, attributable to the increase in the number of turns of a wire forming a coil unit.

Hereinafter, referring to FIG. 26, a skin effect in a metal wire will be described. Referring to FIG. 27, both a skin effect and a proximity effect that may occur when current flows in two neighboring wires will be described.

Figure 26:
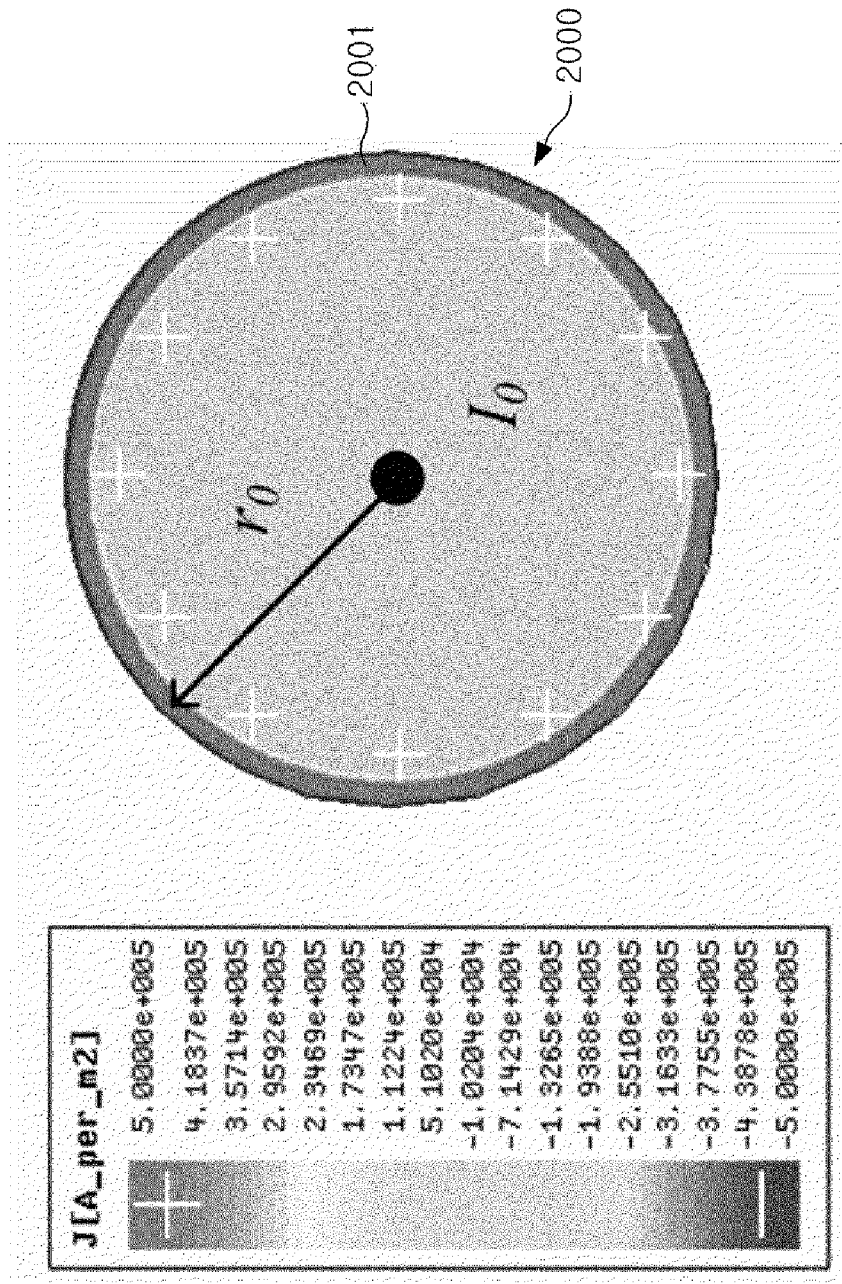
FIG. 26 is a cross-sectional view for explaining a skin effect that is generated when current is applied to a wire.
Figure 27:
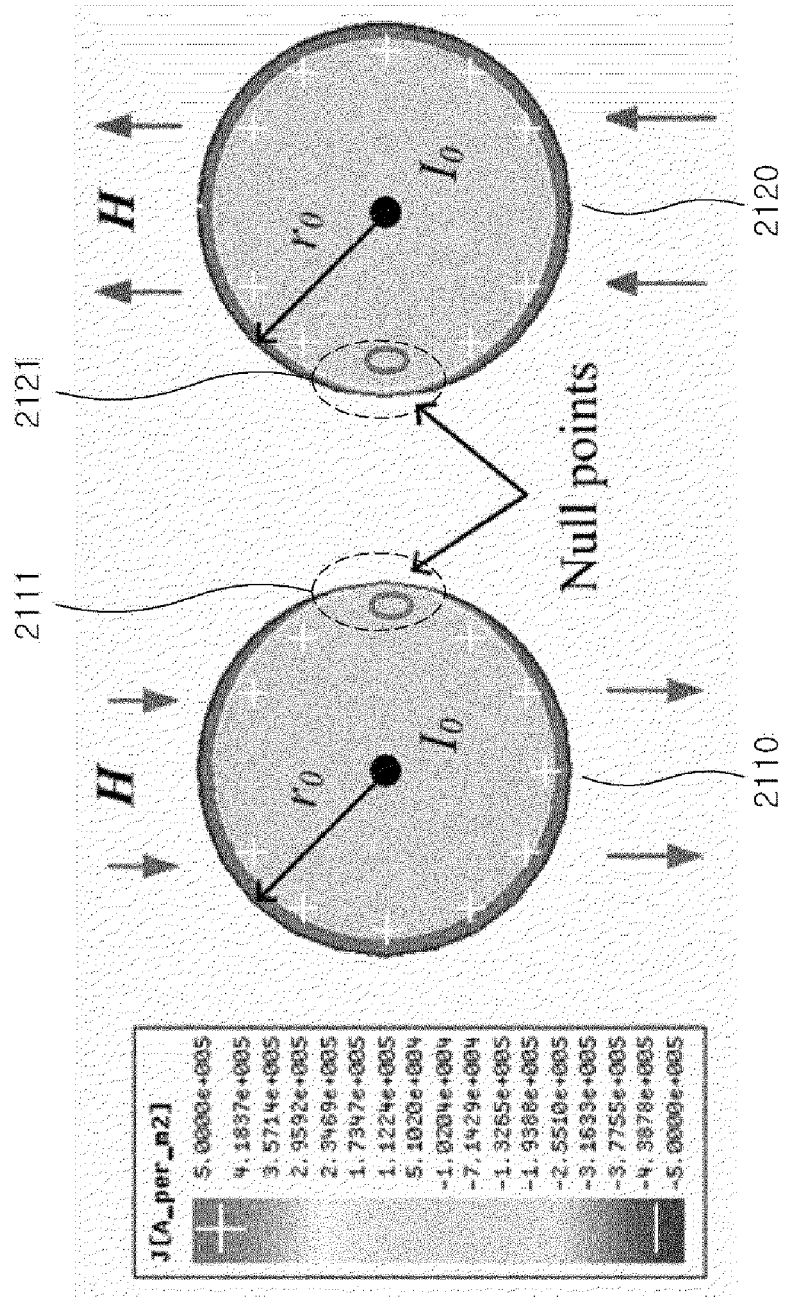
FIG. 27 is a cross-sectional view for explaining a proximity effect when two or more wires are placed close to each other.

FIG. 26 is a cross-sectional view for explaining a skin effect that occurs when current is applied to a wire.

As illustrated in FIG. 26, when current $I_0$ is applied to a single metal wire 2000 of the radius $r_0$, a skin effect in which current is concentrated in the outer layer of the wire because of eddy current occurs. When examining the current density shown in the cross section 2000 of the wire, illustrated in FIG. 26, the current density at the center of the wire is nearly zero, and the current density increases as it is closer to the surface of the wire. FIG. 26 shows the result of a simulation representing this phenomenon, and the surface area 2001 is shown as the current density increases. Referring to FIG. 26, it is confirmed that the current flow is concentrated to the border.

Equation 9 presents the resistance $R_{skin}$ in a wire having a unit length.

$$R_{skin} = R_{DC}\left(\frac{1}{4} + \frac{r_0}{2\delta} + \frac{3}{32}\frac{\delta}{r_0}\right)(\Omega/m) \qquad \text{[Equation 9]}$$

In equation 9, $R_{DC} = 1/(\pi(r_0)^2\sigma)$, $\delta = 1/(\pi f \mu_0 \sigma)^{1/2}$ ($r_0/\delta > 1$), $r_0$ denotes the radius of the wire, and $\sigma$ denotes the conductivity of the wire. Also, f denotes an operating frequency, and $\mu_0$ means the permeability of the wire. $\delta$ denotes the skin depth.

FIG. 27 is a cross-sectional view for explaining a proximity effect when two or more wires are placed close to each other.

Referring to FIG. 27, the same current $I_0$ flows in the same direction within a first wire 2110 and a second wire 2120. The first and second wires have the same size. The radius of the wires is $r_0$, and H marked on each of the wires 2110 and 2120 represents magnetic field that is generated in the neighboring wire and applied to the opposite wire.

The magnetic field H generated in each of the wires 2110 and 2120 prevents current flowing in the areas 2111 and 2121 adjacent to the opposite wire, and as a result, the current density is nearly zero. This phenomenon is referred to as a proximity effect. Particularly, in a coil used for wireless power transmission and a coil structure that requires an increase in the strength of magnetic field, if the number of turns of a coil is increased to enhance the strength of magnetic field, the strength of the magnetic field is increased to a certain degree. However, when the number of turns is excessively increased, resistance may be sharply increased due to the spacing between wires forming the coil and due to the radius of the wire.

Considering the skin effect and the proximity effect, the loss resistance $R_{ohmic}$ in a set of parallel wires having a unit length may be represented as the following equation 10.

$$R_{ohmic} = R_{skin} + R_{prox} = R_{skin}(1+G_p)(\Omega/m) \quad \text{[Equation 10]}$$

As shown in equation 10, the loss resistance Rohmic in a set of parallel wires having a unit length is the sum of resistance Rskin in the wire having the unit length, which is caused by a skin effect, and resistance Rprox in the wires having the unit length, which is caused by a proximity effect. Here, the resistance Rprox in the wires having the unit length, caused by the proximity effect, is the product of Rskin and a proximity factor Gp. Accordingly, the loss resistance Rohmic in a set of parallel wires having a unit length may be expressed as the product of Rskin and (1+Gp), and the unit is $\Omega/m$.

The proximity factor $G_p$ may be calculated by the following equation 11.

$$G_p = \frac{R_{prox}}{R_{skin}} = \frac{8\pi^2\delta^2 x^3(x-1)}{(2x+1)^2+2}\left(\frac{H}{I_0}\right)^2 \quad \text{[Equation 11]}$$

As shown in equation 11, the proximity factor $G_p$ may be determined by x, $\delta$, and H. Here, $\delta$ denotes a skin depth, x denotes $2r_0/\delta$, and $\delta$ and x are determined values. H represents magnetic field generated by current $I_0$ flowing in nearby wires, and H may be different depending on the number of turns of a coil or the spacing between wires.

Consequently, when magnetic field H, generated depending on the number of turns of a coil or the spacing between wires, is obtained, a proximity factor may be obtained, and based on this proximity factor, the loss resistance Rohmic per unit length may be calculated. In other words, the proximity factor may be determined by the effect of magnetic field generated depending on the number of turns of a coil or the spacing between wires, and the total resistance of a spiral coil structure or a helical coil structure may be obtained by multiplying $R_{ohmic}$ by the total length of the coil. As described above, due to a skin effect and a proximity effect, when a coil structure in which a single metal wire is wound in a bundle is used in designing a wire in a high frequency band of several MHz, a proximity factor becomes large and loss resistance is rapidly increased, thus efficiency is largely decreased. Namely, when a metal wire in which the same current flows is wound in many turns, magnetic field may be increased, but resistance is rapidly increased. Therefore, the transmission efficiency is largely decreased, which can be inferred from the equation 8.

Consequently, in a coil structure for wireless power transmission, the present invention discloses a structure in which multiple wires having the same radius are arranged with the same spacing within a predetermined error range in a predetermined section. Here, the spacing between two wires is determined to be optimal spacing that enables minimizing the loss resistance and then maximizing a magnetic field by considering a skin effect and a proximity effect between the wires.

Hereinafter, such a coil unit structure will be described. When designing various forms of coils having uniform spacing, for example, when designing a spiral coil, a helical coil, and the like, it is necessary to derive a relationship for obtaining minimum loss resistance depending on the number of turns of a coil, the radius of a wire, the spacing between wires, etc.

Figure 28:
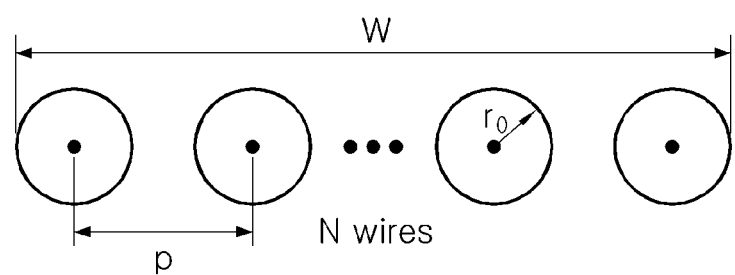
FIG. 28 is a cross-sectional view of a coil unit structure in which multiple wires having a circular cross section are arranged with the same spacing, according to an embodiment of the present invention.

FIG. 28 is a cross-sectional view of a coil unit structure in which multiple parallel wires having a circular cross section are arranged with the same spacing, according to an embodiment of the present invention.

Referring to FIG. 28, N wires having the same radius $r_0$ are arranged uniformly with the distance P between the centers of wires. This structure may be applied to a spiral coil wound in multiple turns, a helical coil wound in multiple turns, a structure in which multiple straight wires are arranged in parallel with each other, and the like.

FIGS. 29 to 32 illustrate a coil unit or a wire structure, which may have the cross section structure illustrated in FIG. 28. The cross section structure illustrated in FIG. 28 may be shown in the cross section from A1 to B1 of the spiral coil illustrated in FIG. 29, the cross section from A2 to B2 of the helical coil illustrated in FIG. 30, and the cross section from A3 to B3 in the straight wire arrangement illustrated in FIG. 31. In the case of the circular spiral coil illustrated in FIG. 29, a single wire is wound in multiple turns on a plane, but a predetermined area AR1 including A1 to B1 may be considered as if multiple wires were arranged with the same spacing as illustrated in FIG. 28. Here, the number of turns of the spiral coil corresponds to the number of wires in the predetermined area, and the distance between the centers of the loops of the spiral coil may correspond to the distance between the centers of the wires in the predetermined area AR1.

Figure 30:
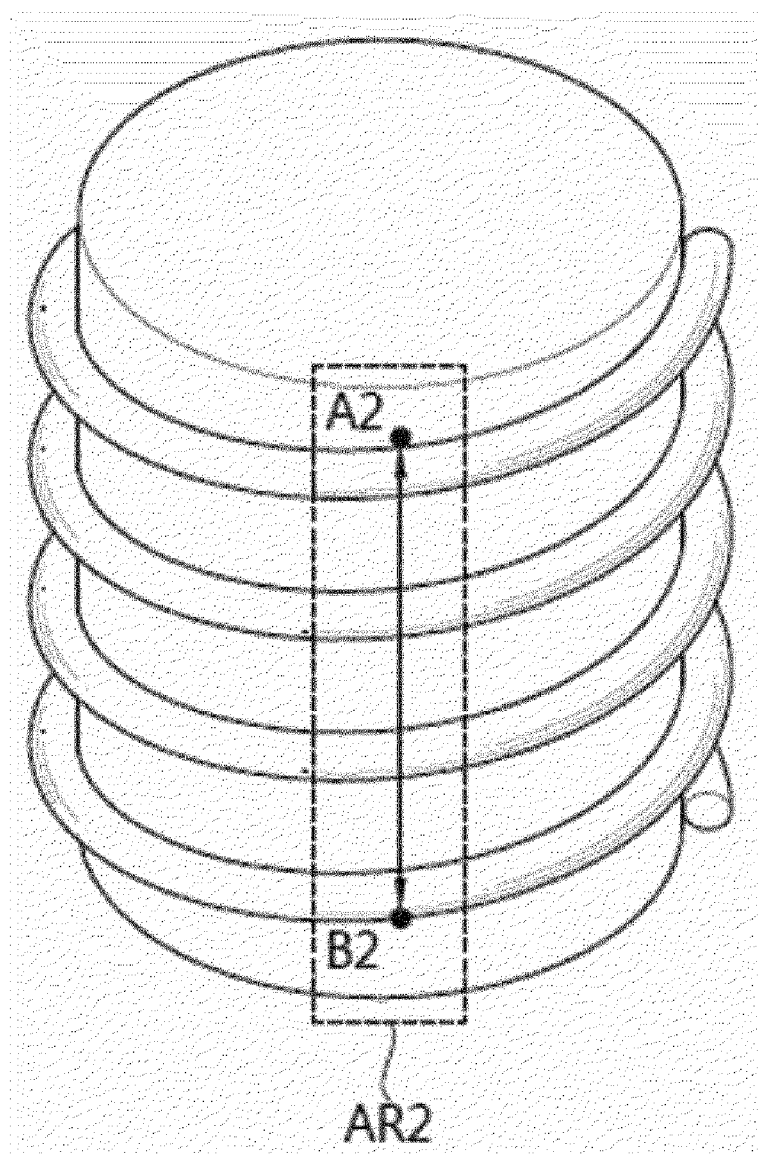

Similarly, in the case of the helical coil illustrated in FIG. 30, a single wire is wound in multiple turns to the vertical direction, but a predetermined area AR2 including A2 to B2 may be considered as if multiple wires were arranged with the same spacing. Here, the number of turns of the helical coil corresponds to the number of wires in the predetermined area, and the distance between the centers of the loops of the helical coil may correspond to the distance between the centers of the wires in the predetermined area AR2.

Figure 29:
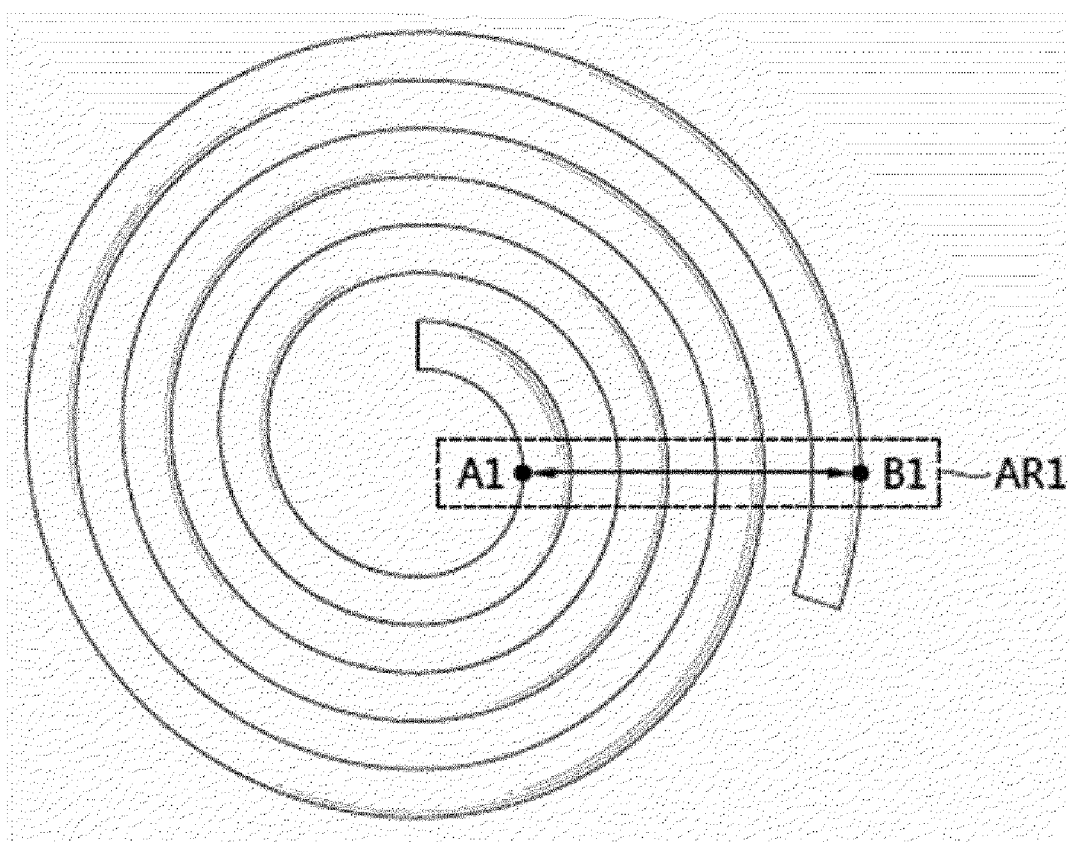
FIGS. 29 to 32 illustrate a coil unit or a wire structure, which may have the cross section structure illustrated in FIG. 28.
Figure 31:
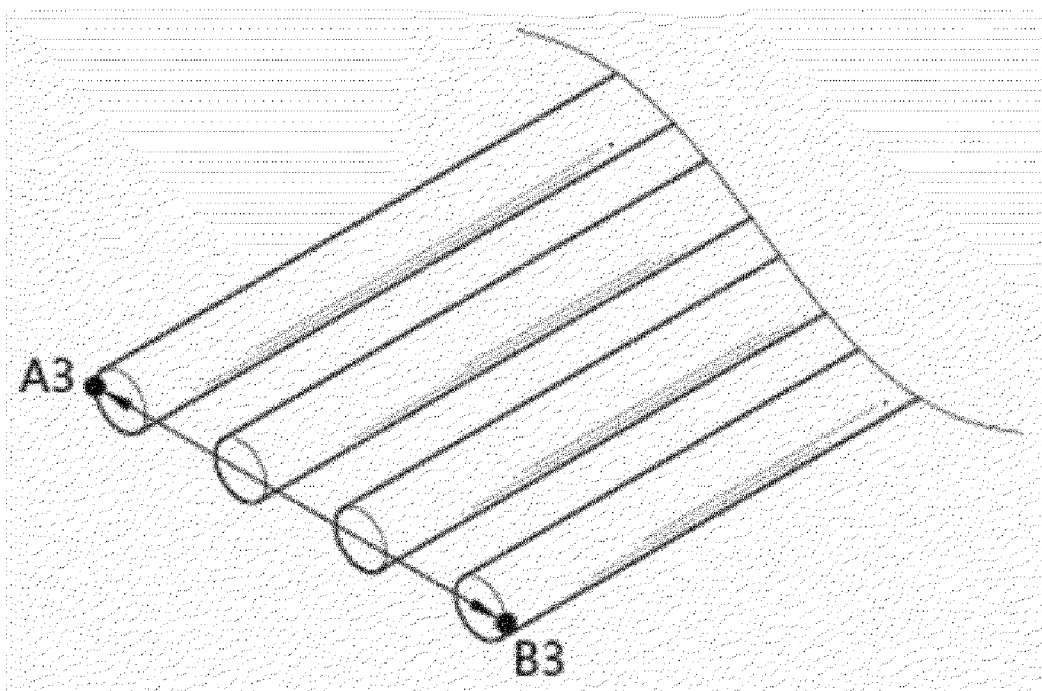

Besides the structures illustrated in FIGS. 29 to 31, any structure having a cross section identical to or similar to the cross section illustrated in FIG. 28 may use a wire-winding method or a wire arrangement method, mentioned in the present invention.

Figure 32:
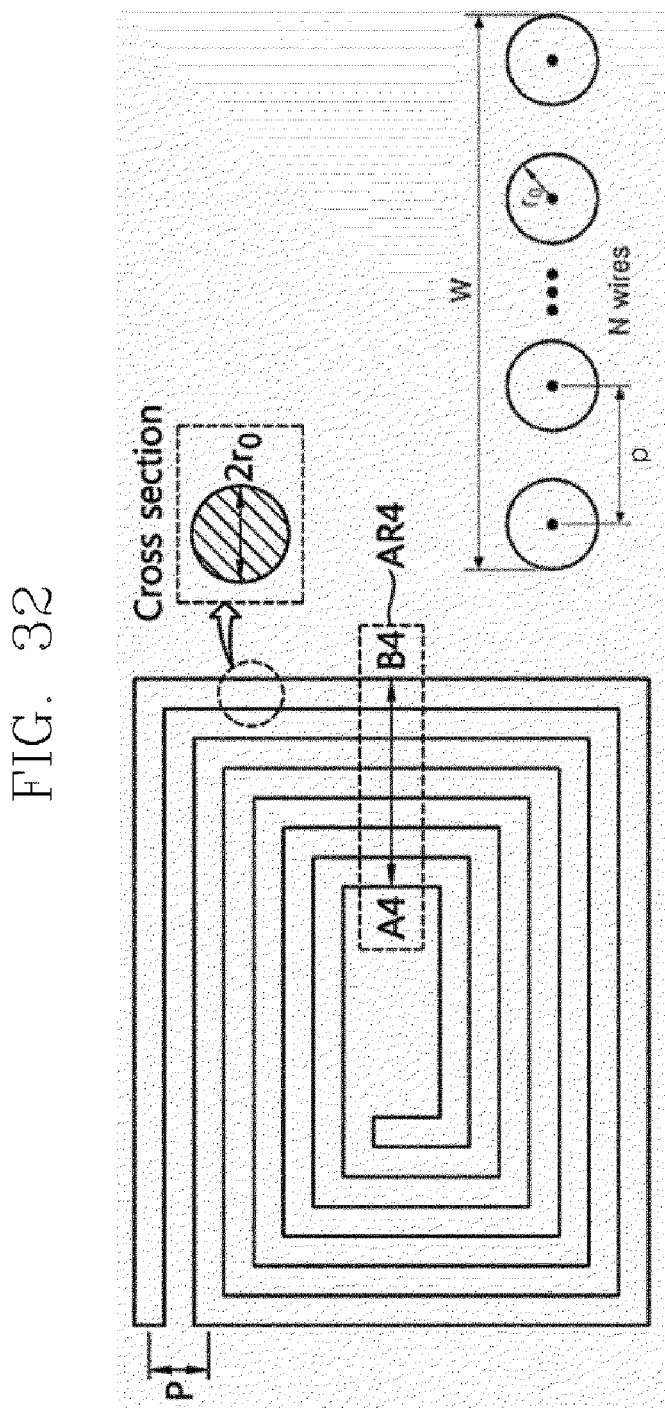

For example, FIG. 32 is a plan illustrating an example in which the structure illustrated in FIG. 28 is applied to a rectangular multi-loop coil unit.

As illustrated in FIG. 32, in the case of the rectangular spiral coil, a single wire is wound to form a rectangular loop on a plane, but a predetermined area AR4 including A4 to B4 may be considered as if multiple wires were arranged with the same spacing. Here, the number of turns of the rectangular spiral coil corresponds to the number of wires in the predetermined area AR4, and the distance between the centers of the rectangular loops of the rectangular spiral coil may correspond to the distance between the centers of the wires in the predetermined area AR4.

In the description with reference to FIG. 28, it is assumed that the illustrated cross-section structure is the cross section structure of a coil unit in which a wire is wound in multiple turns, such as a spiral coil or a helical coil.

Referring to FIG. 28, P may mean a pitch between centers of adjacent wires. For example, P may be the distance from the center of a first wire to the center of a second wire, which is adjacent to the first wire. In the embodiment of the present invention, the spacing between wires of the coil unit illustrated in FIG. 28 is uniform within a predetermined error range. Namely, p between adjacent wires in the coil unit is uniform.

$r_0$ denotes the radius of a wire. N denotes the number of wires arranged in a corresponding area. For example, in a coil unit such as a spiral coil or a helical coil, N may mean the number of turns of a coil. W denotes the total width of the coil unit. In the case of a helical coil, W may be the height of the wound wire (see AR2 in FIG. 30). In the case of a spiral coil, W is the total coil width (see AR1 in FIG. 29), which is the length form the outermost loop to the innermost loop.

The same current flows within each wire. In this case, the equation for minimum resistance in a wire is as follows.

$$\frac{r_0}{W} = 0.6534 N^{(-1.397)} + 0.001815, \quad N = 2, 3, \ldots \quad \text{[Equation 12]}$$

In equation 12, $r_0$ denotes the radius of a wire, W denotes the total width of a coil unit, and N denotes the number of turns of the wire (the number of wires in straight wire arrangement). When $r_0$, W, and N are determined by equation 12, which is the relationship among $r_0$, W, and N, p, which is the distance between centers of adjacent wires, may be determined by the following equation 13.

$$p = (W - 2r_0)/(N - 1) \quad \text{[Equation 13]}$$

By using equation 12 and equation 13, it is possible to variously implement a coil unit capable of decreasing the loss resistance and maximizing the strength of a magnetic field in wireless power transmission. For example, when the variables W and N are preset, a coil may be implemented to have an optimal radius $r_0$ for minimum resistance, based on equation 12 and equation 13. Also, when W and $r_0$ are preset, the number of turns N may be determined to have minimum resistance. In this case, p, the distance between centers of adjacent wires, is also determined.

The relationship for obtaining minimum resistance in a wire, shown in equation 12 and equation 13 may be applied to any case in which multiple wires are arranged in parallel with each other with same spacing or multiple wires are wound with same spacing in a predetermined area.

As mentioned above, to calculate loss resistance in a structure including multiple wires in which the same current flows, it is necessary to calculate magnetic field H, which is generated by neighboring wires and affects a target wire. Therefore, the present invention verifies that equation 12 and equation 13 can be commonly used by examining whether a magnetic field generated in a coil structure in which a wire is wound in multiple turns in a horizontal direction or vertical direction, such as a spiral coil or a helical coil, is identical to magnetic field generated in a structure in which multiple straight wires are arranged in parallel with each other.

Figure 33A:
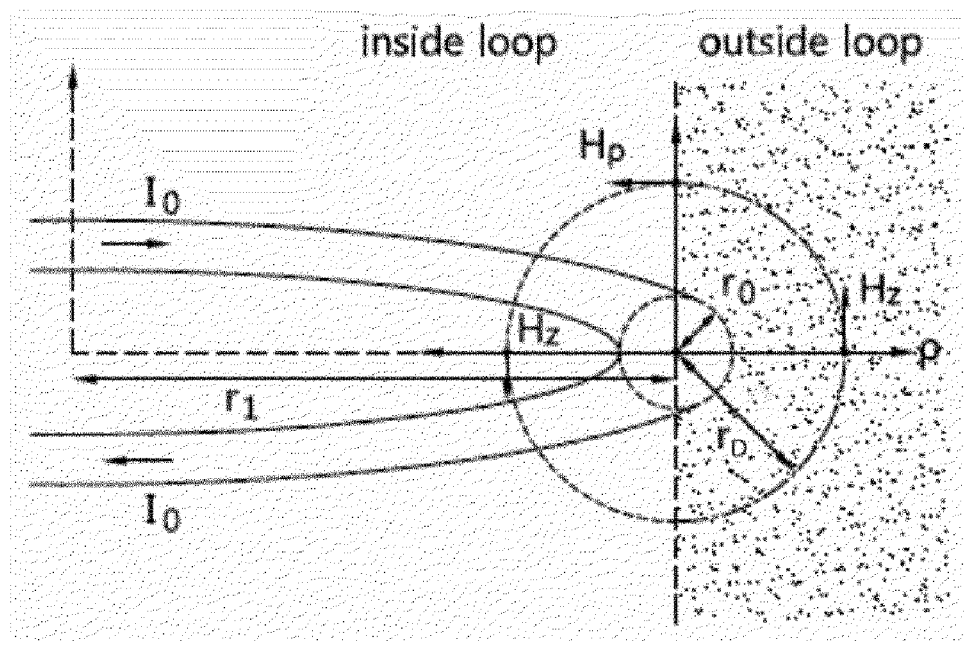
FIG. 33a and FIG. 33b are exemplary views for explaining the generation of a magnetic field in a circular wire structure and an infinite straight wire.
Figure 33B:
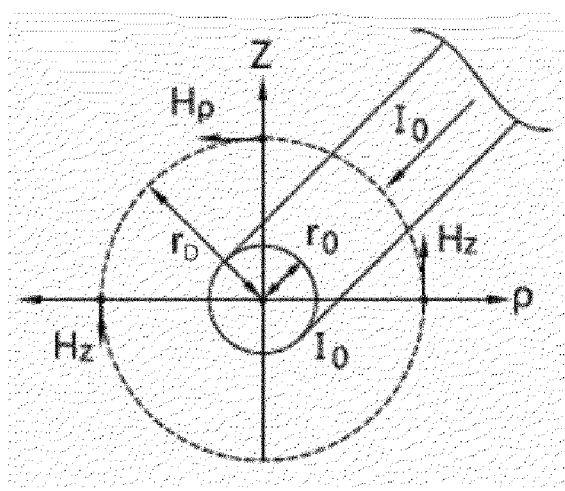

FIG. 33a and FIG. 33b are exemplary views for explaining the generation of magnetic field in a wire structure of a circular cross section and an infinite straight wire. FIG. 33a illustrates the generation of magnetic field in a circular loop included in a spiral coil or a helical coil, and FIG. 33b illustrates the generation of magnetic field in an infinite straight wire. $r_D$ illustrated in FIG. 33a and FIG. 33b is the distance from the center of the wire, and Hz and Hρ are a magnetic field in z direction and a magnetic field in ρ direction, which are generated in position $r_D$. r1 means the distance from the center of a circular loop to the center of a wire.

First, in order to determine whether equation 12 and equation 13 may be applied to a spiral coil structure including multiple loops in a horizontal direction, it is checked whether |Hz|, which is the strength of the magnetic field Hz, in the position $r_D$ of an inside loop illustrated in FIG. 33a, |Hz| in the position $r_D$ of an outside loop, and |Hz| in the position $r_D$ of the infinite straight wire illustrated in FIG. 33b are very similar. Additionally, in order to check whether a magnetic field is different depending on the change of r1, the case in which r1 is 2 cm is compared with the case in which r1 is 20 cm. In comparison, the strength of magnetic field |Hz| is normalized by maximum |Hz| at each radius.

Figure 34:
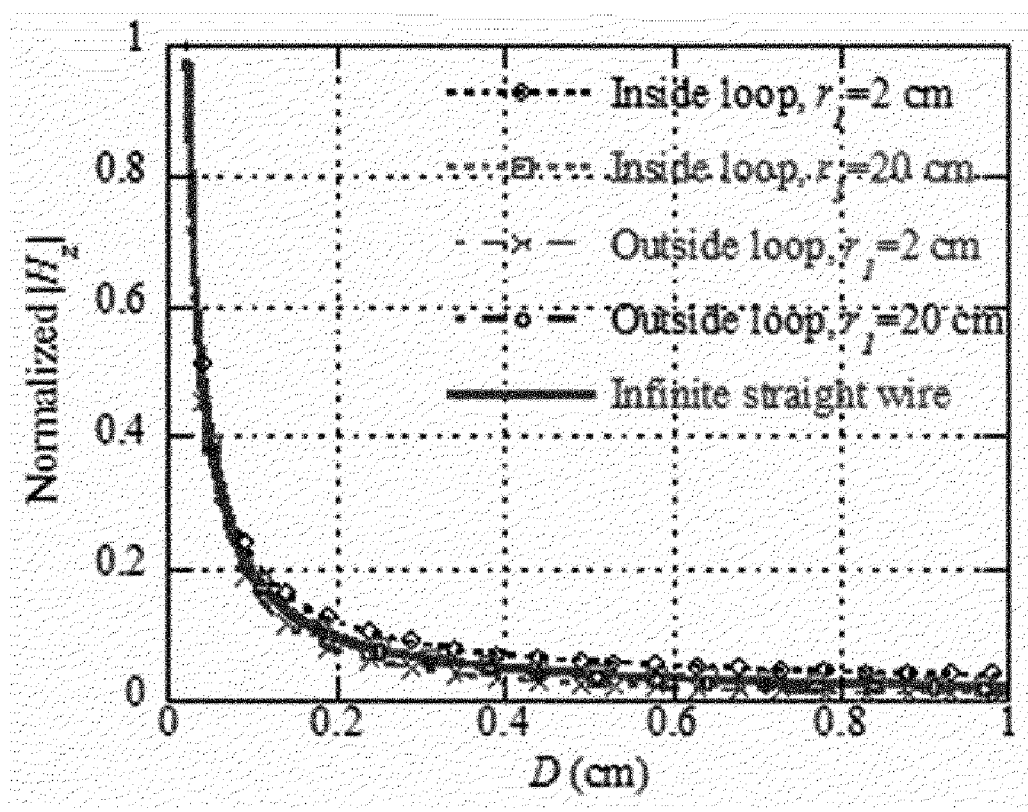
FIG. 34 is a graph representing the curve of generated depending on the change of D in the inside and outside of a circular loop and in an infinite straight wire.

FIG. 34 is a graph representing the curve of |Hz|, generated depending on the change of $r_D$ in the inside and outside of a circular loop and in an infinite straight wire.

As illustrated in FIG. 34, it is confirmed that |Hz| in the position $r_D$ generated in the inside of a circular loop, |Hz| in the position $r_D$ generated in the outside of the circular loop, and |Hz| in the position $r_D$ generated in an infinite straight wire are nearly identical. Also, |Hz| generated in the position $r_D$ when r1 is 2 cm is nearly identical to that when r1 is 20 cm. Therefore, the above-described relationship, namely, equation 12 and equation 13, may be applied to the spiral coil structure as applied to the infinite straight wire structure.

Figure 35:
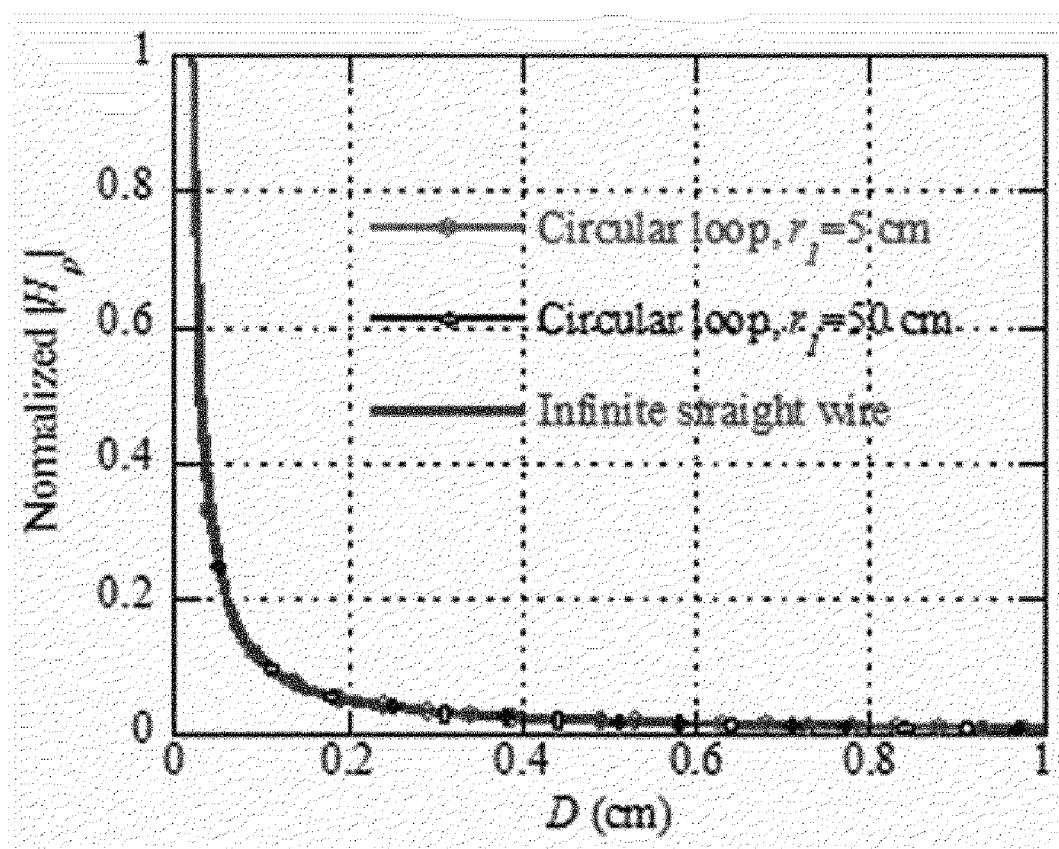
FIG. 35 is a graph representing the curve of |H|, generated depending on the change of D in a circular loop and in an infinite straight wire.

Meanwhile, in order to determine whether equation 12 and equation 13 may be applied to a helical coil structure in which multiple wires are wound in a vertical direction, it is checked whether |Hρ|, which is the absolute value of Hρ, in the circular loop illustrated in FIG. 33a is similar to |Hρ| in the position D of the infinite straight wire illustrated in FIG. 33b. Additionally, in order to check whether a magnetic field is different depending on the change of r1, the case in which r1 is 5 cm is compared with the case in which r1 is 50 cm. FIG. 35 is a graph representing the curve of |Hρ|, generated depending on the change of D in a circular loop and in an infinite straight wire. In comparison, the strength of magnetic field |Hρ| is normalized by maximum |Hρ| at each radius.

As illustrated in FIG. 35, it is confirmed that |Hρ| in the position $r_D$ generated in the circular loop is nearly identical to that generated in an infinite straight wire. Also, |Hρ| generated in the position D when r1 is 5 cm is nearly identical to that when r1 is 50 cm. Therefore, the above-described relationship, namely, equation 12 and equation 13 may be applied to the helical coil structure as applied to the infinite straight wire structure.

Therefore, equation 12 and equation 13 may be commonly used if the cross section of a predetermined area in a spiral coil, a helical coil, and multiple infinite straight wires, illustrated in FIGS. 29 to 31, is identical to the structure illustrated in FIG. 28.

Meanwhile, as mentioned above, in a coil unit structure in which a wire is wound in multiple turns such as a spiral coil or a helical coil or in a structure in which multiple wires are arranged in parallel with each other, the present invention proposes a structure in which the distance between centers of wires is uniform. Hereinafter, the basis supporting the assumption that the loss resistance generated in a wire has the lowest value when the distance between centers of adjacent wires is uniform will be described.

Figure 36:
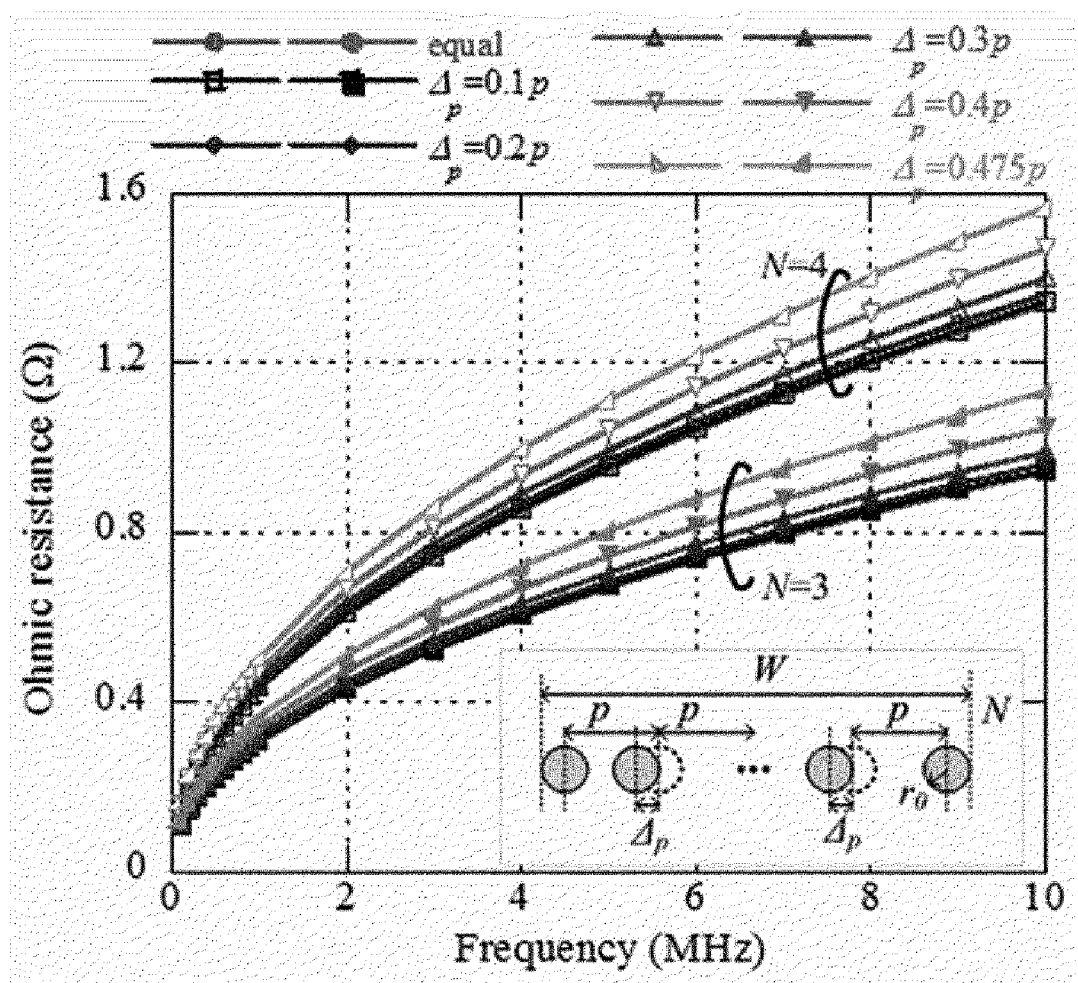
FIG. 36 is a graph for comparing loss resistance when the distance between centers of wires of a coil unit is uniform and when that is not uniform.

FIG. 36 is a graph for comparing loss resistance when the distance between centers of wires of a coil unit is uniform and when that is not uniform, and represents the case when the number of turns of a wire, N is 3 and the case when N is 4.

The simulation example illustrated in FIG. 36 shows the change of loss resistance depending on the change of a frequency when the radius r0 of a wire is 0.5 mm, the total width of the coil unit is fixed, and the length of each wire is 1 m. The wires located in both ends of the coil unit are fixed, and the other wires moves as Δp based on the distance between the centers of adjacent wires, p=2 mm. When Δp is zero, it means that the distance between the centers of adjacent wires is uniform, namely, the wires are in an equally-spaced arrangement.

As illustrated in FIG. 36, loss resistance increases as a frequency is higher and Δp increases. Namely, when the wires of a coil unit are arranged with the same spacing, the loss resistance has the lowest value, and as a wire is closer to a certain wire, the loss resistance increases. Therefore, when the distance between the centers of adjacent wires in a coil unit is uniform, magnetic field may be most effectively generated during wireless power transmission.

Meanwhile, as mentioned above, the embodiment of the present invention proposed a structure in which multiple wires having the same radius are arranged with the same spacing. Furthermore, the embodiment of the present invention proposed a relationship between variables for minimizing loss resistance caused by a skin effect and a proximity effect between wires, in a coil unit including the above structure, through equation 12 and equation 13.

FIG. 37 represents the ratio of the radius of a wire to the total width of a coil unit for minimizing loss resistance depending on the number of turns N of the coil unit.

As illustrated in FIG. 37, within a range in which the number of turns N of a coil unit is equal to or greater than 2 and is equal to or less than 1000, the ratio of the radius $r_0$ of a wire to the total width W of a coil unit, $r_0/W$ is determined as the following equation 14.

$$0.001857 \leq r_0/W \leq 0.249923 \qquad \text{[Equation 14]}$$

As represented in equation 14, the ratio of the radius of a wire to the total width of a coil is equal to or greater than 0.001857 and is equal to or less than 0.249923. When a margin in actual implementation is considered, $r_0/W$ may be determined as 0.0018 to 0.25 in a range in which the number of turns of a coil unit, N is equal to or greater than 2 and is equal to or less than 1000.

Figure 38:
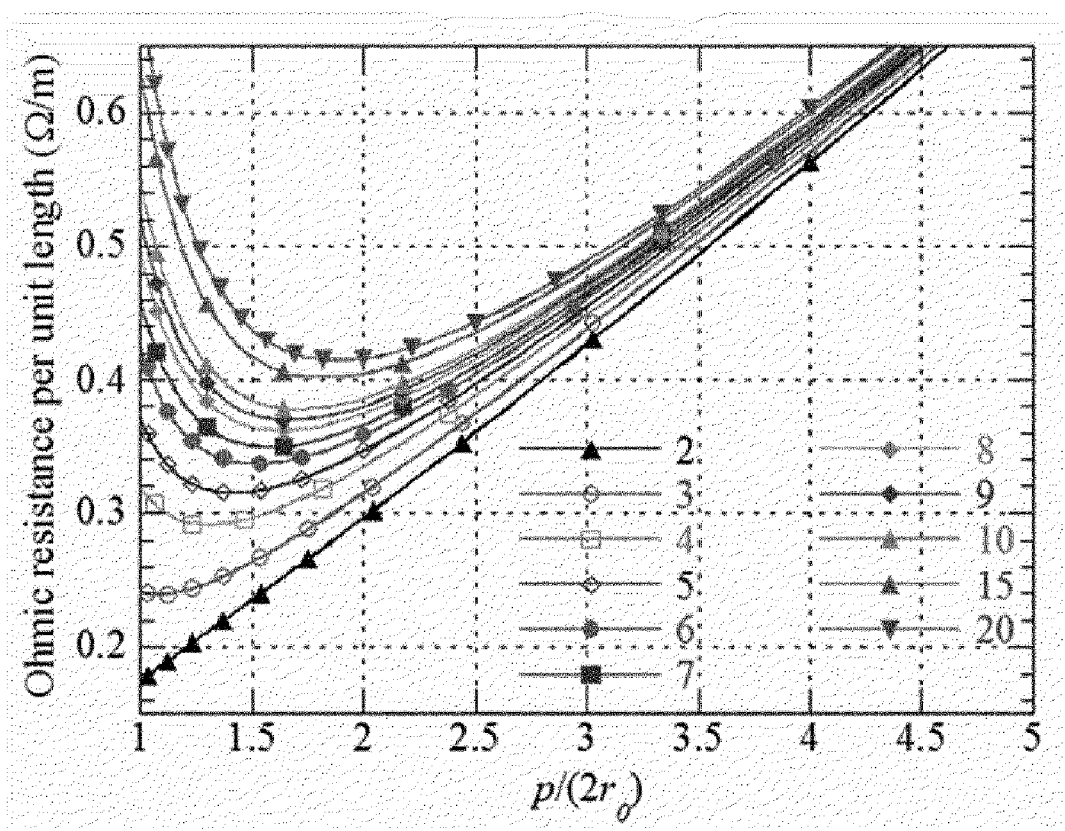
FIG. 38 a graph illustrating the curve of the loss resistance per unit length according to the number of turns N of a coil unit when the ratio of p to $2r_0$, namely, $p/2r_0$ varies, p indicating the distance between the centers of adjacent wires and $2r_0$ indicting the diameter of a wire.

FIG. 38 a graph illustrating the curve of the loss resistance per unit length according to $p/2r_0$ for various number of turns.

In the measurement illustrated in FIG. 38, the simulation condition is that the distance between the centers of adjacent wires, p is 2 mm, and $r_0$ is greater than 0.2 mm and less than 1 mm. Namely, $p/2r_0$ has a value that is greater than 1 and less than 5.

As illustrated in FIG. 38, excluding the case in which the number of turns N is 2 and 3, the loss resistance rapidly decreases from the point when $p/2r_0$ is 1, the loss resistance has the lowest value when $p/2r_0$ is in a range from 1.3 to 1.9, and after that, the loss resistance increases.

FIG. 39 shows the value of $p/2r_0$ for minimum loss resistance according to the number of turns N. As illustrated in FIG. 39, $p/2r_0$ allowing minimum resistance has a value close to 1 only when N is 2 and 3, and is within a range from 1.2987 to 1.8182 when N is equal to or greater than 4.

Figure 40:
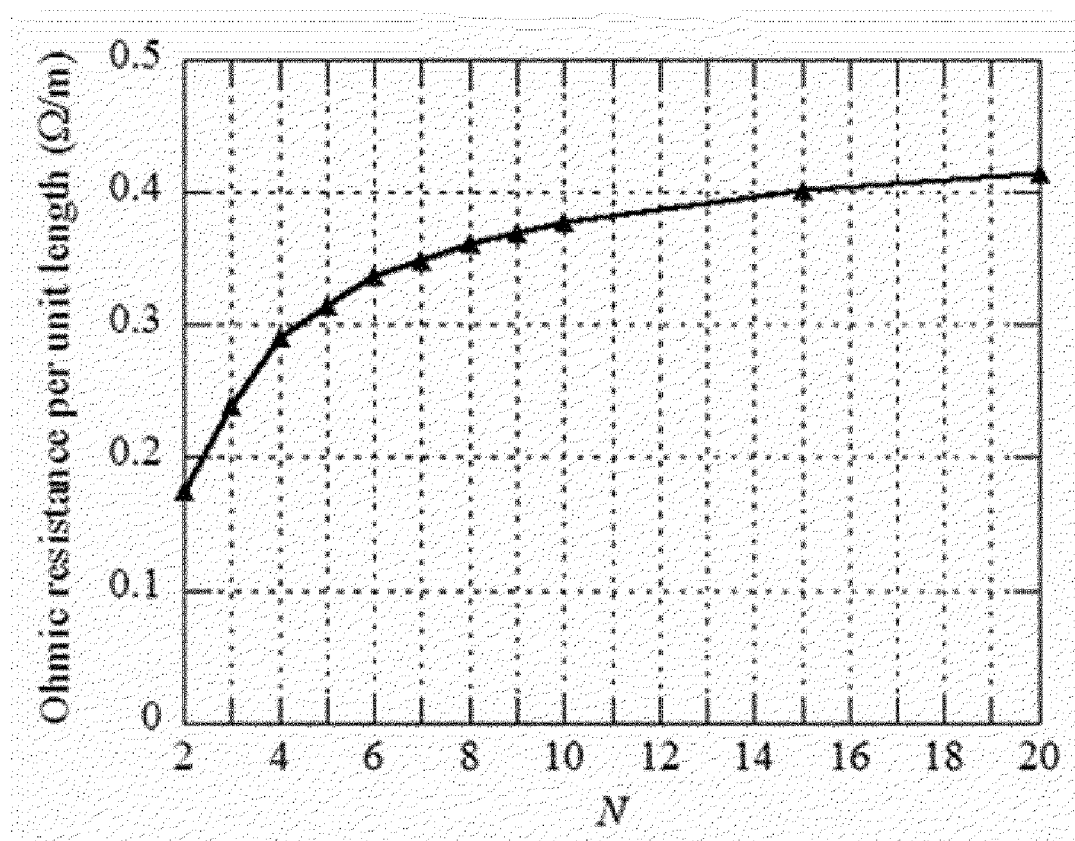
FIG. 40 is a graph illustrating optimal (minimum) loss resistance per unit length according to the number of turns N.
Figure 41:
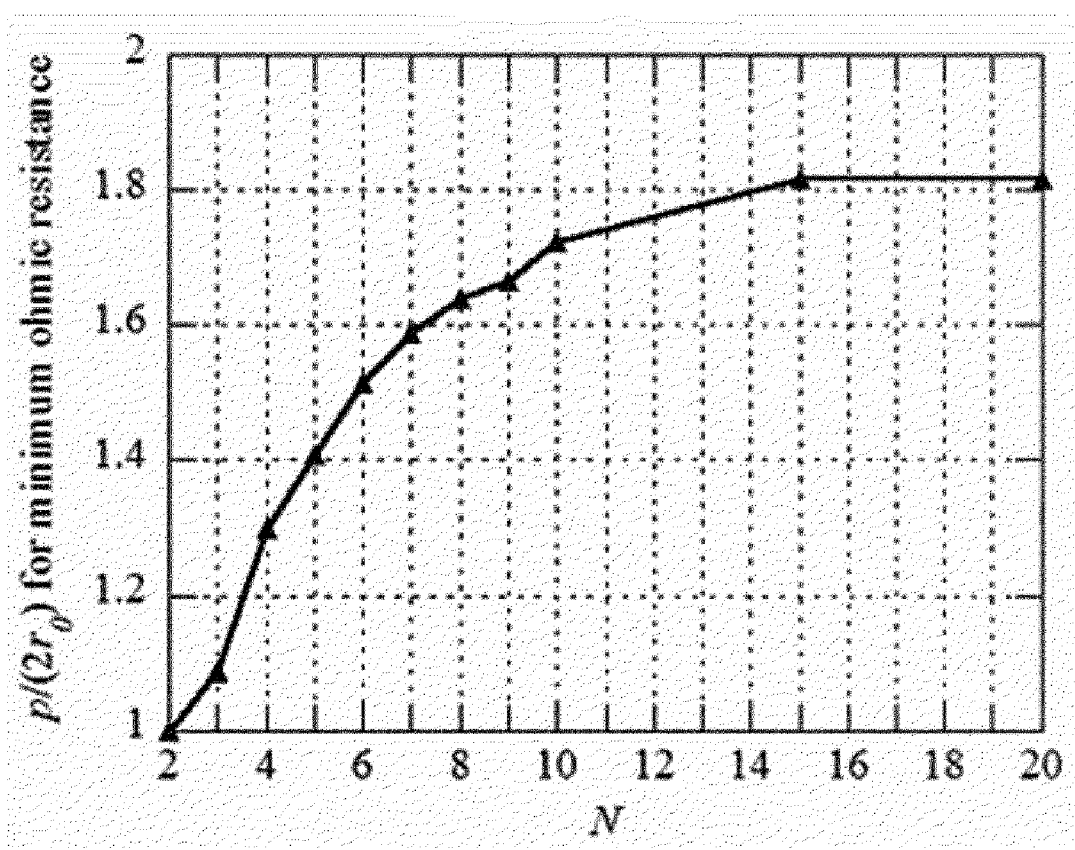
FIG. 41 is a graph illustrating the value of $p/2r_0$ for minimum loss resistance per unit length according to the number of turns N.

FIG. 40 is a graph illustrating optimal (minimum) loss resistance per unit length according to the number of turns N, and FIG. 41 is a graph illustrating the value of $p/2r_0$ for minimum loss resistance per unit length according to the number of turns N. Referring to FIGS. 39 to 40, when N is 2, the optimal loss resistance per unit length is 0.1743 Ω/m, and after that, it steadily increases. Accordingly, when N is 20, the value becomes 0.4152 Ω/m. Referring to FIGS. 39 and 41, when the number of turns N is 2, $p/2r_0$ allowing minimum resistance is nearly 1, but $p/2r_0$ rapidly increases from the point when N is 4. From the point when N is 15, $p/2r_0$ has a nearly constant value, which is about 1.8.

The above description is merely an illustration of the technical spirit of the present invention, and those having ordinary knowledge in the technical field to which the present invention pertains can make modifications and variations within the range that does not depart from the essential characteristics of the present invention. Accordingly, the disclosed embodiments of the present invention are not intended to limit the technical spirit of the present invention but to illustrate the technical spirit of the present invention, and the scope of the technical spirit of the present invention is not limited to these embodiments. The range of protection of the present invention should be interpreted based on the following claims, and all technical spirit within the range equivalent to the claims should be construed as falling within the range of the rights of the present invention.

The invention claimed is:

1. A wireless power transmitting device, comprising:
a bowl-shaped transmitting device body; and
a transmitting coil unit for wirelessly transmitting power to a receiving device,
wherein the transmitting coil unit comprises:
a multi-loop coil unit wound flatways in a bottom of the transmitting device body; and
a helical coil unit extending from the maximum radius of the multi-loop coil unit, wound around a side wall of the transmitting device body, and wound to increase a radius of a coil loop in a direction to an upper part,
wherein the whole or a part of the receiving device is located in an interior area defined by the transmitting device body, and receives wireless power from the wireless power transmitting device, and
wherein the wireless power transmitting device generates a magnetic field that is formed in a wider area than the sum of magnetic fields independently generated by the helical coil unit and the multi-loop coil unit.

2. The wireless power transmitting device of claim 1, wherein the helical coil unit is extended from an end of the multi-loop coil unit.

3. The wireless power transmitting device of claim 1, wherein the helical coil unit ranges in gradient from an angle of 5 degrees to an angle of 90 degrees with regard to the bottom of the transmitting device body.

4. The transmitting coil unit of claim 1, the helical coil unit may have any shape corresponding to a surface of the transmitting device body.

5. The wireless power transmitting device of claim 1, wherein the transmitting coil unit performs control for a magnetic field pattern with a shape and the number of turns of the transmitting coil unit, the spacing between wires, or a tilted angle of the helical coil unit based on a strength of receiving magnetic field when an arrangement of a receiving coil unit is parallel with the transmitting coil unit or perpendicular to the transmitting coil unit, according to an environment condition in which a magnetic flux density interlinked with the receiving coil unit of the receiving device becomes maximum or minimum.

6. The wireless power transmitting device of claim 1, further comprising a source coil unit for transmitting power to the transmitting coil unit by being supplied with the power from a power source.

7. The wireless power transmitting device of claim 1, further comprising one or more matching units for controlling impedance matching in the transmitting coil unit depending on a load of the receiving device and mutual inductance between the transmitting coil unit and the receiving device.

8. The wireless power transmitting device of claim 7, wherein the one or more matching units comprise a source coil for transmitting power to a transmitting coil of the transmitting coil unit by being supplied with the power from a power source, and the source coil is separated from the transmitting coil.

9. The wireless power transmitting device of claim 1, wherein an end of at least one of the multi-loop coil unit and the helical coil unit is connected to one or more capacitors in series or in parallel.

10. The wireless power transmitting device of claim 1, wherein at least one of the multi-loop coil unit and the helical coil unit is wound in a form of any one of a circular coil, a polygonal coil, and an elliptical coil.

11. The wireless power transmitting device of claim 1, wherein the transmitting coil unit transmits power simultaneously to multiple receiving devices having different load characteristics.

12. The wireless power transmitting device of claim 1, wherein the transmitting coil unit comprises a source coil for Tx impedance matching and a transmitter resonant coil.

13. A wireless power transmitting device, comprising:
a bowl body;
a multi-loop coil unit wound flatways and generating magnetic field for supplying wireless power, from a bottom surface of the bowl body; and
a helical coil unit extending from the maximum radius of the multi-loop coil unit and supplying wireless power from a side wall of the bowl body,
wherein the wireless power transmitting device generates a magnetic field for supplying wireless power to cover a wider spatial area compared to the sum of magnetic fields independently generated by the multi-loop coil unit and the helical coil unit,
wherein a receiving device is arranged in any direction, and
wherein the whole or a part of the receiving device is located in an interior area defined the bowl body, and receives wireless power from the wireless power transmitting device.

14. The wireless power transmitting device of claim 13, wherein the multi-loop coil unit is arranged in the bottom surface of the bowl body, and
the helical coil unit is wound along the side wall of the bowl body, and wound to increase a radius of a coil loop in a direction to an upper part.

15. A wireless power receiving device, comprising:
a bowl-shaped receiving device body; and
a receiving coil unit for receiving wireless power supplied from a wireless power transmitting device,
wherein the receiving coil unit comprises:
a multi-loop coil unit wound flatways in a bottom surface of the receiving device body; and
a helical coil unit extending from the maximum radius of the multi-loop coil unit, wound around a side wall of the receiving device body, and wound to increase a radius of a coil loop in a direction to an upper part,
wherein the whole or a part of the wireless power transmitting device is located in an interior area defined by the receiving device body, and transmits the wireless power to the wireless power receiving device, and
wherein the wireless power transmitting device generates a magnetic field that is formed in a wider area than the sum of magnetic fields independently generated by the helical coil unit and the multi-loop coil unit.

16. The wireless power receiving device of claim 15, wherein the helical coil unit is extended from an end of the multi-loop coil unit.

17. The wireless power receiving device of claim 15, wherein the receiving coil unit further comprises one or more matching units for controlling impedance matching in the receiving coil unit depending on a load of the receiving device,
wherein the one or more matching units comprise a receiving coil and an impedance matching circuit, the receiving coil receiving the wireless power from a transmitting coil unit of the wireless power transmitting device, the impedance matching circuit forming a parallel resonance circuit of the load of the receiving device.

18. A wireless power transceiver system, comprising:
a wireless power transmitting device; and
a wireless power receiving device,
wherein the wireless power transmitting device comprises:
a bowl-shaped transmitting device body; and
a transmitting coil unit for wirelessly transmitting power to the wireless power receiving device,
wherein the transmitting coil unit comprises:
a multi-loop coil unit wound flatways in a bottom of the transmitting device body; and
a helical coil unit extending from the maximum radius of the multi-loop coil unit, wound around a side wall of the transmitting device body, and wound to increase a radius of a coil loop in a direction to an upper part,
wherein the whole or a part of the wireless power receiving device is located in an interior area defined by the transmitting device body, and receives wireless power from the wireless power transmitting device, and
wherein the wireless power transmitting device generates a magnetic field that is formed in a wider area than the sum of magnetic fields independently generated by the helical coil unit and the multi-loop coil unit.

19. The wireless power transceiver system of claim 18, wherein the wireless power receiving device comprises:
a box-shaped receiving device body; and
a receiving coil unit for receiving power supplied from the wireless power transmitting device,
wherein the receiving coil unit comprises a multi-loop coil unit wound in a bottom of the receiving device body in a rectangular shape.

20. The wireless power transceiver system of claim 18, wherein the wireless power receiving device comprises:
- a bowl-shaped receiving device body; and
- a receiving coil unit for receiving power supplied from the wireless power transmitting device, wherein the receiving coil unit comprises:
- a first horizontal coil unit that is wound horizontally to be aligned with a first plane of a supporting means, and
- a second horizontal coil unit that is wound horizontally to be aligned with a second plane of the supporting means.

* * * * *